United States Patent
Singh et al.

(10) Patent No.: US 9,088,981 B2
(45) Date of Patent: *Jul. 21, 2015

(54) ACCESS POINT COMMUNICATION BASED ON TRANSMISSION OF PHYSICAL LAYER IDENTIFIERS ACCORDING TO AT LEAST ONE TIME OFFSET

(71) Applicant: QUALCOMM Incorporated, San Diego, CA (US)

(72) Inventors: Damanjit Singh, San Diego, CA (US); Peerapol Tinnakornsrisuphap, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/789,423

(22) Filed: Mar. 7, 2013

(65) Prior Publication Data

US 2013/0244641 A1  Sep. 19, 2013

Related U.S. Application Data

(60) Provisional application No. 61/612,097, filed on Mar. 16, 2012.

(51) Int. Cl.
*H04J 3/06* (2006.01)
*H04W 72/04* (2009.01)
(Continued)

(52) U.S. Cl.
CPC .......... *H04W 72/0426* (2013.01); *H04W 48/00* (2013.01); *H04W 48/12* (2013.01); *H04W 48/16* (2013.01); *H04W 56/00* (2013.01); *H04W 92/20* (2013.01)

(58) Field of Classification Search
CPC .............. H04W 88/08–88/188; H04W 92/02; H04W 92/04; H04W 92/12; H04W 92/14; H04W 92/20
USPC ...................... 455/422.1, 443, 444, 448–453; 370/310.2, 319, 320, 328–330, 335, 370/338, 341, 342, 344, 345, 350
See application file for complete search history.

(56) References Cited

U.S. PATENT DOCUMENTS 7,307,971 B2  12/2007  Park et al.
2008/0117835 A1 *  5/2008  Grilli et al. .................... 370/252

(Continued)

FOREIGN PATENT DOCUMENTS

WO  2009012271 A1  1/2009
WO  2012062427 A1  5/2012

OTHER PUBLICATIONS

International Search Report and Written Opinion—PCT/US2013/031711—ISA/EPO—Jul. 6, 2013.

*Primary Examiner* — San Htun
(74) *Attorney, Agent, or Firm* — Fariba Yadegar-Bandari

(57) ABSTRACT

Information is communicated between access points to cause a recipient access point to invoke an action. In some aspects, a mapping is defined between: 1) sets of physical layer identifiers and/or associated time offsets; and 2) different types of information. The mapping information is provided to access points in a wireless communication system such that an access point can use this scheme to communicate specified types of information to another access point. Based on the mapping, an access point that receives a set of physical layer identifiers from another access point is able to determine the type of information being communicated. The recipient access point may then invoke a specific action based on the type of information that was communicated.

49 Claims, 16 Drawing Sheets

(51) Int. Cl.
*H04W 48/16* (2009.01)
*H04W 48/00* (2009.01)
*H04W 56/00* (2009.01)
*H04W 48/12* (2009.01)
*H04W 92/20* (2009.01)

(56) References Cited

U.S. PATENT DOCUMENTS

| | | | |
|---|---|---|---|
| 2008/0214201 A1* | 9/2008 | Fang et al. | 455/452.2 |
| 2009/0023464 A1 | 1/2009 | Prakash et al. | |
| 2009/0122773 A1* | 5/2009 | Gogic | 370/338 |
| 2009/0129291 A1* | 5/2009 | Gupta et al. | 370/254 |
| 2010/0029278 A1 | 2/2010 | Fang et al. | |
| 2010/0040038 A1* | 2/2010 | Tinnakornsrisuphap et al. | 370/345 |
| 2010/0167742 A1* | 7/2010 | Rajagopalan et al. | 455/436 |
| 2010/0203891 A1 | 8/2010 | Nagaraja et al. | |
| 2010/0240365 A1 | 9/2010 | Chen | |
| 2010/0291934 A1* | 11/2010 | Lopes | 455/446 |
| 2011/0189995 A1 | 8/2011 | Tinnakornsrisuphap et al. | |
| 2011/0274097 A1* | 11/2011 | Zhang et al. | 370/338 |
| 2013/0005326 A1 | 1/2013 | Flanagan | |
| 2013/0244648 A1 | 9/2013 | Singh et al. | |

* cited by examiner

ACCESS POINT COMMUNICATION BASED ON TRANSMISSION OF PHYSICAL LAYER IDENTIFIERS ACCORDING TO AT LEAST ONE TIME OFFSET

CLAIM OF PRIORITY

This application claims the benefit of and priority to commonly owned U.S. Provisional Patent Application No. 61/612,097, filed Mar. 16, 2012, the disclosure of which is hereby incorporated by reference herein.

CROSS-REFERENCE TO RELATED APPLICATION

This application is related to concurrently filed and commonly owned U.S. patent application Ser. No. 13/789,447, entitled "ACCESS POINT COMMUNICATION BASED ON TRANSMISSION OF MULTIPLE PHYSICAL LAYER IDENTIFIERS," the disclosure of which is hereby incorporated by reference herein.

BACKGROUND

1. Field

This application relates generally to wireless communication and more specifically, but not exclusively, to access point communication.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

In some networks, low-power access points (e.g., femtocells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

At a given point in time, an access terminal may be served by a given one of these access points. As the access terminal roams throughout the geographical area, the access terminal may move away from its serving access point and move closer to another access point. In addition, signal conditions within a given cell may change, whereby an access terminal may be better served by another access point. In these cases, to maintain mobility for the access terminal, the access terminal may be handed-over from its serving access point to the other access point.

In general, for handing-over an active call user from a source cell to a target cell, the unique cell identity of the target cell has to be known at the source cell. In a planned macrocell deployment, mapping between physical layer identities (such as PSCs in UMTS) and cell identities of the neighboring cells is pre-provisioned by an operator or network infrastructure vendor at each cell for handover purposes. Thus, when an access terminal (e.g., a UE) reports the physical layer identity (e.g., PSC) of a neighboring cell, the source cell uses the provisioned mapping to determine the cell identity and, thereby, initiate handover to the target cell.

In contrast, it may be more difficult to provide a mapping between physical layer identities and cell identities for low-power access point deployments. For example, these deployments are generally unplanned and are allotted a relatively small number of physical layer identities relative to the number of low-power access points. Thus, it is desirable to have low-power access points self-discover this information.

There are several challenges associated with the discovery of such a target cell identity, however. First, in UMTS, pre-Release 9 UE reports do not contain the cell identity of the target cell. Thus, this information cannot be obtained from measurement reports in these cases. Second, a source low-power access point may not be able to detect all of its neighboring low-power access points via a co-located receiver (also known as network listen module or NLM) and thereby decode the broadcast information from those low-power access points for the cell identity information. For example, other relatively nearby low-power access points may be "hidden" from (e.g., not detectable by) a source low-power access point, even though they may be close enough to be seen by (e.g., detectable by) an access terminal within the coverage of the source low-power access point.

Further to the above, there are other reasons why it is desirable for a low-power access point to be able to communicate with its neighbor access points. For example, access points in communication may coordinate on selection parameters such as transmit power and physical layer identifiers and may share identifiers, paging area codes, or other information. In this way, the access points may cooperate to improve service in the area, mitigate interference between access points, facilitate handover of access terminals between access points, and so on. In view of the above, there is a need for effective techniques for enabling communication between access points.

SUMMARY

A summary of several sample aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to a communication scheme for communicating information between access points. In some aspects, this information is communicated to cause a recipient access point to invoke a specified action.

The communication scheme involves defining a mapping between: 1) sets of physical layer identifiers and/or associated time offsets; and 2) different types of information (e.g., a condition at an access point, a request to the recipient access point, etc.). For example, the mapping may correlate different sets of physical layer identifiers (e.g., PSCs) with different types of information. As another example, the mapping may correlate the time offset(s) between the physical layer identifiers with different types of information. As another example, a given set of physical layer identifiers and associated time offset(s) are collectively mapped to a particular type of information.

This mapping information is provided to access points in a wireless communication system such that an access point can use this scheme to communicate one of the specified types of information to another access point. Thus, an access point may transmit different sets of physical layer identifiers, where each set is associated with a particular type of information. Alternatively, or in addition, the time offset(s) between the transmitted physical layer identifiers may be associated with a particular type of information.

In some aspects, each physical layer identifier is transmitted via a different pilot (i.e., pilot signal). That is, an access point transmits a plurality of pilots comprising the plurality of physical layer identifiers, where a given pilot comprises (e.g., is encoded based on) a mutually exclusive one of the physical layer identifiers.

Based on the above mapping, an access point that receives physical layer identifiers (e.g., via pilots) is able to determine the type of information being communicated. The recipient access point may then invoke a designated action (e.g., adjust transmit power, change a local parameter, etc.) based on the type of information that was communicated.

In view of the above, in some aspects, wireless communication in accordance with the teachings herein involves: determining that information is to be communicated from a first access point to a second access point; identifying a type of the information to be communicated; selecting at least one time offset between a plurality of physical layer identifiers, wherein the selection is based on the identified type of information; and transmitting a plurality of pilots comprising the plurality of physical layer identifiers according to the determined at least one time offset.

In some aspects, wireless communication in accordance with the teachings herein involves: receiving a plurality of pilots comprising a plurality of physical layer identifiers at a second access point; identifying at least one time offset associated with the plurality of physical layer identifiers; identifying a type of information communicated by a first access point, wherein the identification of the type of information is based on the identified at least one time offset; and invoking at least one operation of the second access point based on the identified type of information.

In some aspects, wireless communication in accordance with the teachings herein involves: determining that information is to be communicated from a first access point to a second access point; identifying a type of the information to be communicated; selecting a plurality of physical layer identifiers, wherein the selection is based on the identified type of information; and transmitting the selected plurality of physical layer identifiers.

In some aspects, wireless communication in accordance with the teachings herein involves: receiving a plurality of pilots comprising a plurality of physical layer identifiers at a second access point; identifying a type of information communicated by a first access point, wherein the identification is based on the plurality of physical layer identifiers; and invoking at least one operation of the second access point based on the identified type of information.

BRIEF DESCRIPTION OF THE DRAWINGS

These and other sample aspects of the disclosure will be described in the detailed description and the claims that follow, and in the accompanying drawings, wherein:

Figure 1:
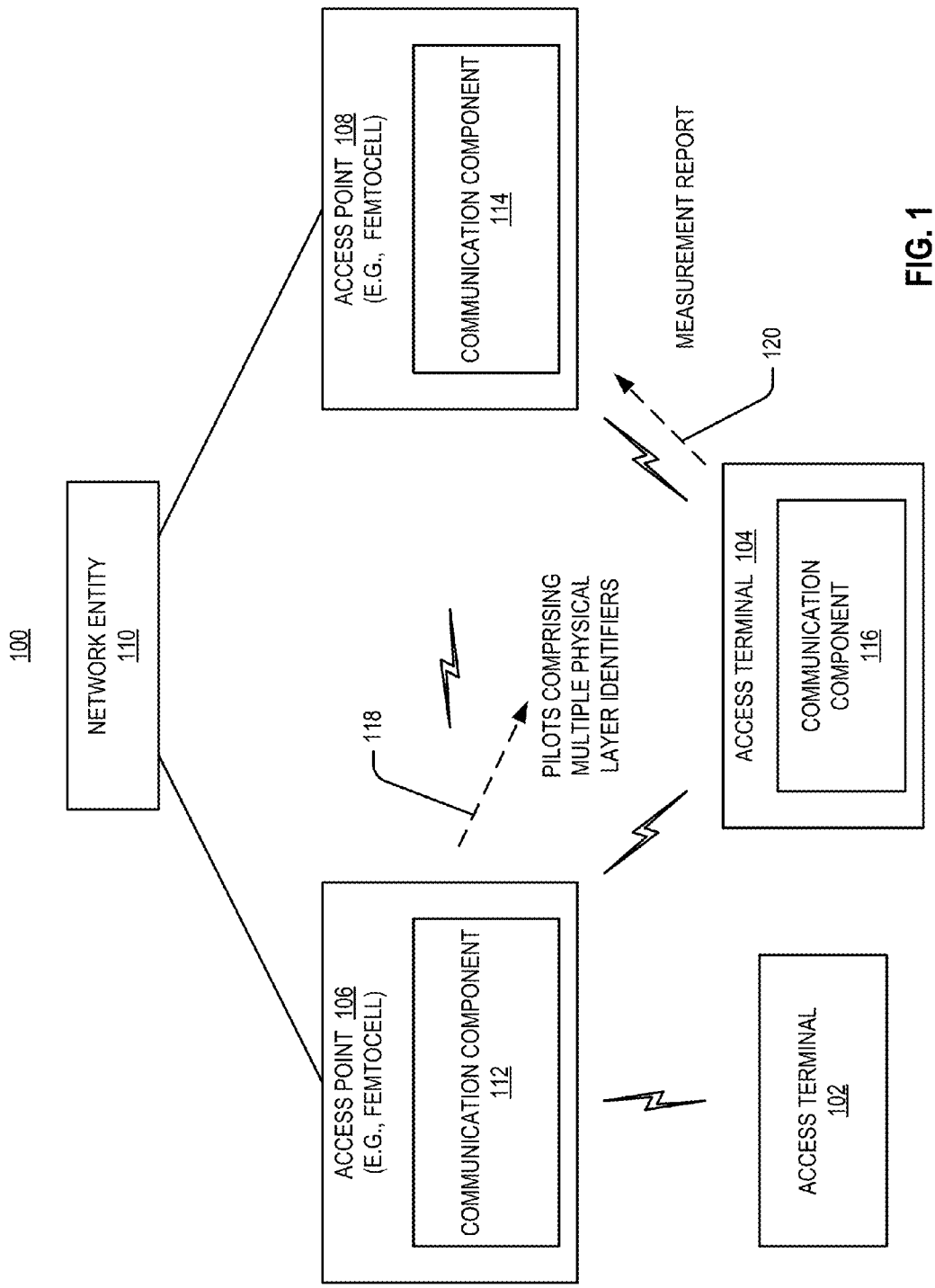
FIG. 1 is a simplified block diagram of a sample communication system supporting inter-access point communication through the use of multiple physical layer identifiers.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect disclosed herein may be embodied by one or more elements of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macrocells, femtocells, and so on, while access terminals may be referred to or implemented as user equipment (UEs), mobile stations, and so on.

Access points in the system 100 provide access to one or more services (e.g., network connectivity) for one or more wireless terminals (e.g., access terminals 102 and 104) that may be installed within or that may roam throughout a coverage area of the system 100. For example, at various points in time the access terminal 102 may connect to an access point 106, an access point 108, or some other access point in the system 100 (not shown). Similarly, at various points in time the access terminal 104 may connect to the access point 106, the access point 108, or some other access point.

Each of the access points may communicate with one or more network entities (represented, for convenience, by a network entity 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations the network entity 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

As indicated in FIG. 1, some of the access points (e.g., the access points 106 and 108) in the system 100 comprise low-power access points. Various types of low-power access points may be employed in a given system. For example, low-power access points may be implemented as or referred to as femtocells, femto access points, small cells, femto nodes, home NodeBs (HNBs), home eNodeBs (HeNBs), access point base stations, picocells, pico nodes, or microcells. Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femtocells may have a maximum transmit power of 20 dBm or less. In some implementations, low-power access points such as picocells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

For convenience, low-power access points may be referred to simply as femtocells or femto access points in the discussion that follows. Thus, it should be appreciated that any discussion related to femtocells or femto access points herein may be equally applicable to low-power access points in general (e.g., to picocells, to microcells, to small cells, etc.).

Femtocells may be configured to support different types of access modes. For example, in an open access mode, a femtocell may allow any access terminal to obtain any type of service via the femtocell. In a restricted (or closed) access mode, a femtocell may only allow authorized access terminals to obtain service via the femtocell. For example, a femtocell may only allow access terminals (e.g., so called home access terminals) belonging to a certain subscriber group (e.g., a closed subscriber group (CSG)) to obtain service via the femtocell. In a hybrid access mode, alien access terminals (e.g., non-home access terminals, non-CSG access terminals) may be given limited access to the femtocell. For example, a macro access terminal that does not belong to a femtocell's CSG may be allowed to access the femtocell only if sufficient resources are available for all home access terminals currently being served by the femtocell.

In a typical deployment model, femtocells operating in one or more of these access modes are used to provide indoor coverage and/or extended outdoor coverage. By allowing access to users through adoption of a desired access mode of operation, femtocells may provide improved service within the coverage area and potentially extend the service coverage area for users of a macro network.

Under certain circumstances, an access point such as a femtocell may need to communicate with another such access point. For example, the access point 106 may need to communicate with the access point 108 to facilitate handover of the access terminal 104 (e.g., acquire cell identifiers, exchange handover information, etc.) or to mitigate interference in the neighborhood (e.g., request interference avoidance). However, communication through the backhaul (e.g., via the network entity 110) may be impractical (e.g., too burdensome on the core network) or impossible in some cases. For example, the access point 106 may not have access to sufficient information (e.g., address information) to enable communication with the access point 108 via the backhaul.

The disclosure relates in some aspects to transmitting more than one physical layer identifier shifted in time by at least one time offset to communicate information to neighboring access points (e.g., cells). In some aspects, the specific information to be communicated is indicated by the specific physical layer identifiers and/or the specific time offset(s) selected for the communication.

To facilitate this inter-access point communication, the access point 106, the access point 108, and the access terminal 104 are depicted in FIG. 1 as including a communication component 112, a communication component 114, and a communication component 116, respectively. For example, to convey certain information to the access point 108, the communication component 112 selects a set of physical layer identifiers and/or time offset(s) that corresponds to that information, and transmits multiple pilots 118 comprising these physical layer identifiers, at the appropriate time offset(s). These pilots 118 may be received by a nearby access terminal (e.g., the access terminal 104) and/or by a neighboring access point that is able to receive downlink signaling (e.g., the access point 108).

For the first scenario, upon receipt of the pilots 118 by the access terminal 104, the communication component 116 transmits a measurement report 120 to report detection of the physical layer identifiers and the corresponding time offset(s). Upon receiving the measurement report 120, the communication component 114 determines the information being conveyed by the physical layer identifiers and/or the corresponding time offset(s). The access point 108 may then take appropriate action based on the communicated information.

For the second scenario, upon receipt of the signal 118 by the access point 108, the communication component 114 determines the information being conveyed by the physical layer identifiers and/or the corresponding time offset(s). The access point 108 may then take appropriate action based on the communicated information.

In general, the disclosed communication scheme may be used to communicate any type of information between access points. In some implementations, this information comprises a cell identity of the access point (e.g., femtocell) that transmits the physical layer identifiers. Accordingly, along with other uses, the teachings herein may be employed to facilitate handover between access points, and to enable an access point to detect physical layer identifier confusion and physical layer identifier collision in a neighborhood.

Sample aspects of such a communication scheme will now be described in more detail in conjunction with the flowchart of FIG. 2. For purposes of illustration, the operations of FIG. 2 (or any other operations discussed or taught herein) may be described as being performed by specific components (e.g., components of FIG. 1 or FIG. 8). In addition, these operations may be described in the context of a UMTS system or an LTE system. It should be appreciated, however, that these operations may be performed by other types of components and may be performed using a different number of components, and that the teachings herein are applicable to other types of communication systems. It also should be appreciated that one or more of the operations described herein might not be employed in a given implementation.

In the discussion that follows, an access point initiating a communication is referred to as the first access point, while an access point to which the communication is directed is referred to as the second access point.

Figure 2:
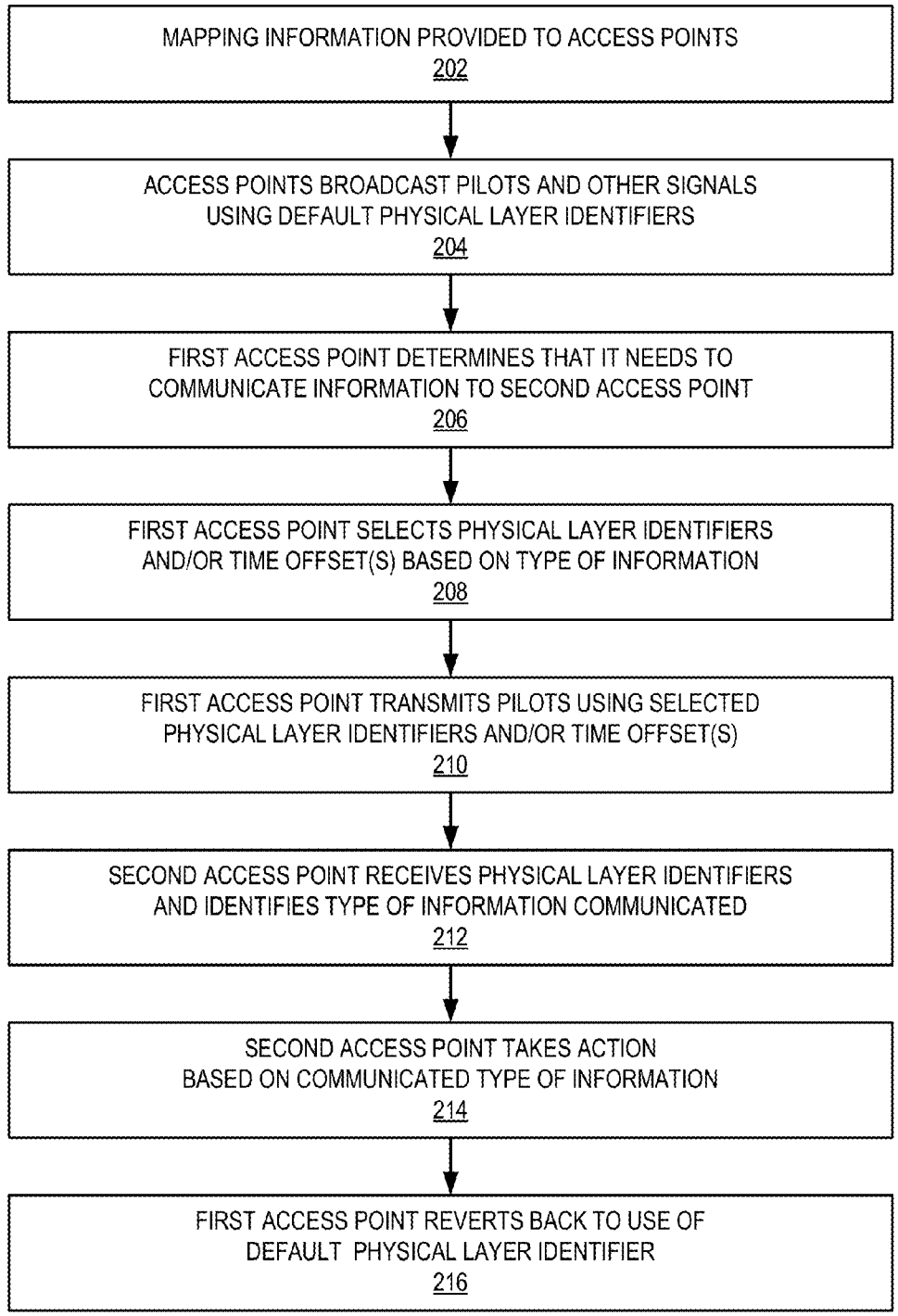
FIG. 2 is a flowchart of several sample aspects of operations performed in conjunction with access point communication based on the use of multiple physical layer identifiers.

As represented by block 202 of FIG. 2, mapping information that maps physical layer identifiers and/or associated time offsets with different types of information is provided to access points in a wireless communication system. For example, this information may be maintained in a central database that is accessible by the access points or this information may be sent to each of the access points or other related entities.

As represented by block 204, in accordance with conventional practice, each of the access points in a given neighborhood of a system transmit pilots and other similar signals using one or more broadcast parameters. For example, upon deployment an access point may be assigned a default physical layer identifier to use. Preferably, although not always, each access point uses a physical layer identifier that is unique within that neighborhood. In this way, different access points can be distinguished from one another based on their respective physical layer identifiers. For example, in UMTS each access point may broadcast a pilot coded by a primary scrambling code (PSC). In this case, the identity of the access point that broadcasts a given pilot may be determined based on the corresponding PSC. Depending on the wireless technology, each access point may broadcast other information such as a location area code (LAC), a routing area code (RAC), a physical cell identity (PCI), or a cell identifier.

As represented by block 206, at some point in time, a first access point may determine that it needs to communicate with at least one other access point. For example, a second access point may be interfering with reception at an access terminal being served by the first access point. Accordingly, the first access point may wish to send a request to the second access point to change one or more of its transmission parameters (e.g., transmit power, channel, etc.). As another example, the first access point may detect identifier confusion (e.g., two access points using the same PSC). In this case, the first access point may wish to report this confusion to its neighboring access points so that one or more of those access points (i.e., at least one of the access points broadcasting the identifier) can take action to eliminate the confusion. As another example, the first access point may wish to communicate with a second access point to facilitate handover of one or more access terminals. For example, the first access point may wish to encourage the second access terminal to accept a handover from the first access point.

As discussed herein, such inter-access point communication may not always be possible over the backhaul. The first access point may thus advantageously employ inter-access point communication in accordance with the teachings herein.

As represented by block 208, the first access point selects a set of physical layer parameters and/or time offset(s) based on the type of information to be sent. As discussed herein, different physical layer identifiers may be mutually exclusively associated with different types of information. For example, a first type of communication may be associated with a first set of physical layer identifiers, a second type of communication may be associated with a second set of physical layer identifiers, and so on. Similarly, different time offsets may be mutually exclusively associated with different types of information. For example, a first type of communication may be associated with a first set of time offsets, a second type of communication may be associated with a second set of time offsets, and so on. Thus, once the first access point selects a type of information to be sent, the first access point may enable communication of this information to the second access point through the selection of the appropriate physical layer parameters and/or time offset(s).

Several examples of information that may be communicated in this manner follow. Where applicable, different values associated with a given type of information (e.g., overloaded versus underloaded; or actual load values) may be indicated by different physical layer parameters and/or by different time offsets. One or more of the following types of information may be communicated during a given communication (e.g., by appropriate mapping to the physical layer parameters selected for the communication).

In some implementations, the communicated information comprises load information for a first access point. The load information may relate to, for example, loading on a radiofrequency (RF) channel, loading on the backhaul, available transmit power, and so on. A first access point may send such information, for example, to inform the second access point that the first access point is overloaded. In this way, the first access point may be able to encourage handover of one or more access terminals to the second access point and/or discourage handovers from the second access point.

In some implementations, the communicated information comprises at least one capability supported by a first access point. This capability may relate to, for example, backhaul bandwidth, maximum transmit power, and so on. A first access point may send such information, for example, to inform the second access point that the first access point either does or does not have the capability to accept handovers from the second access point. Similarly, this information may be sent to encourage or discourage handovers to the second access point.

In some implementations, the communicated information comprises availability of at least one resource of the first access point. The at least one resource may comprise, for example: channel elements and/or backhaul bandwidth. A first access point may send such information, for example, to inform the second access point that the first access point either does or does not have the resources available to accept handovers from the second access point. Similarly, this information may be sent to encourage or discourage handovers to the second access point.

In some implementations, the communicated information comprises an indication of physical layer (e.g., PSC) confusion in a neighborhood of the first access point. This indication may optionally specify the physical layer parameter that is subject to confusion.

In some implementations, the communicated information comprises an indication to commence transmission on (e.g., of) a specified channel. The transmission on a specified channel may comprise, for example, transmitting on another common pilot channel (CPICH) with another physical layer parameter (e.g., PSC). Such an indication may comprise, for example, a request to the second access point to commence transmission on the specified channel or a notification that the first access point will commence transmission on the specified channel. A first access point may send such information, for example, in the event another channel is experiencing an unacceptable level of interference.

In some implementations, the communicated information comprises a request to change at least one parameter at the second access point. The at least one parameter may relate to, for example, at least one of: a primary scrambling code (PSC), a physical cell identity (PCI), a random access channel (RACH) parameter, a location area code (LAC), a routing area code (RAC), a tracking area code (TAC), a closed subscriber group identifier (CSG ID), a CSG Indicator, a SIB schedule, invoking transmission of an additional SIB, a transmit power, an access restriction, or an access mode. A first access point may send such a request, for example, in an attempt to mitigate interference, mitigate identifier confusion, or facilitate handover.

In some implementations, the communicated information comprises a request to turn off the second access point. For example, the request may ask the second access point to turn off its transmitter for a specified period of time. A first access point may send such a request, for example, to temporarily stop interference caused by the second access point.

In some implementations, the communicated information comprises a request to reboot the second access point. For example, the request may ask the second access point to reboot itself as soon as possible. A first access point may send such a request, for example, to bring the second access point back into service.

In some implementations, the communicated information comprises a request to the second access point to accept handover of an access terminal. Accordingly, this request may include information about the access terminal, the current session for the access terminal, and any other information needed to conduct the handover.

In some implementations, the communicated information comprises an alarm indication at the first access point. The alarm indication may relate to, for example, at least one of: temporary inability to accept additional users (i.e., users' access terminals), possibility of shut down, or loss of backhaul.

Referring to block 210 of FIG. 2, the first access point transmits pilots comprising the physical layer identifiers. The pilots are also generated according the specified time offset(s), if applicable.

As represented by block 212, the second access point receives the physical layer identifiers. For example, the second access point may directly receive the pilots transmitted at block 210 and determine the associated physical layer identifiers and time offset(s). Alternatively, an access terminal being served by the second access point may receive the pilots transmitted at block 210 and determine the associated physical layer identifiers and time offset(s). The access terminal will then transmit a measurement report to the second access point, whereby the measurement report indicates the physical layer identifiers and time offset(s). In either case, based on the particular physical layer identifiers and/or time offset(s) used to transmit the pilots, the second access point is able to identify the type of information being communicated by the first access point.

As represented by block 214, the second access point then takes appropriate action based on the communicated type of information. Several examples of actions that may be taken (e.g., operations performed) by a second access point follow. One or more of the following types of operations may be performed in response to a given communication. For example, the operation(s) to be performed may be indicated by appropriate mapping to the physical layer parameters used and, hence, appropriate mapping to the communicated information.

In some implementations, the operation performed comprises adjusting a transmit power of the second access point. The second access point may adjust its transmit power based on, for example, one or more of: loading at the first access point, capabilities of the first access point, available resources at the first access point, a request to change transmit power received from the first access point, an alarm at the first access point, and so on. As a specific example, if the second access point determines based on information received from the first access point that the first access point is not transmitting heavily (e.g., based on information indicating that the first access point is underloaded, has limited resources, has limited capabilities, is shutting down because of under an alarm condition, etc.), the second access point may elect to increase its transmit power.

In some implementations, the operation performed comprises changing at least one parameter (e.g., at least one broadcast parameter) used by the second access point. For example, a broadcast parameter may be changed based on one or more of: an indication of PSC confusion, a request to commence transmission on another channel received from the first access point, a request to change a parameter received from the first access point, an alarm condition at the first access point, and so on. In some implementations, a changed broadcast parameter relates to at least one of: a primary scrambling code (PSC), a physical cell identity (PCI), a random access channel (RACH) parameter, a location area code (LAC), a routing area code (RAC), a tracking area code (TAC), a closed subscriber group identifier (CSG ID), a CSG Indicator, a SIB schedule, or invoking transmission of an additional SIB. As an example of the addition of a SIB, the first access point may request the second access point to transmit a certain information element (IE), where transmission of this IE requires the second access point to start a new SIB.

In some implementations, the operation performed comprises transmitting on another channel (e.g., a different CPICH). Such an operation may be performed, for example, based on one or more of: loading at the first access point, capabilities of the first access point, available resources at the first access point, receipt of a request to the second access point to transmit on another channel, an alarm condition at the first access point, and so on. For example, if the first access point appears to be heavily loaded or limited in capacity or resources, the second access point may elect to transmit on another channel to free up resources for the first access point. In some implementations, the transmission on the other channel comprises using another physical layer identifier (e.g., PSC).

In some implementations, the operation performed comprises changing an access restriction and/or access mode of a second access point. Such an operation may be performed, for example, based on one or more of: loading at the first access point, capabilities of the first access point, available resources at the first access point, a request to change access restriction and/or access mode, an alarm, and so on. For example, the second access point may switch to using a more permissive access restriction or access mode (e.g. switch from closed access mode to a hybrid access mode) if the first access point is overloaded (e.g. handling too many access terminals). In this way, the second access point may take on some of the load.

In some implementations, the operation performed comprises sending a message to another access point. Such an operation may be performed, for example, based on one or more of: an indication of physical layer identifier confusion, a received request, an alarm, and so on. In some implementations, the message relates to changing a physical layer parameter (e.g., PSC). In some implementations, the message relates to changing an upper layer parameter (e.g., LAC, CSG ID). In some implementations, the message relates to acknowledging monitoring of uplink transmissions from the access terminal.

In some implementations, the operation performed comprises turning off a second access point or rebooting a second access point. Such an operation may be performed, for example, based on a request to turn off or reboot that was received from the first access point.

In some implementations, the operation performed comprises accepting specified messages via a backhaul. Such an operation may be performed, for example, based on a request to receive the messages. In some implementations, the specified messages are handover-related messages.

Referring now to block 216 of FIG. 2, at some point in time, the first access point reverts back to using the default physical layer parameter that the first access point previously used (e.g., at block 204). In some cases, this reversion may occur a defined period of time after the reconfiguration of blocks 208-210. Such an approach may be used, for example, where it may be assumed that there will not be any need to send any more information to the second access point before the expiration of the defined period of time (e.g., the second access point is expected to complete its operation without fail). In some cases, this reversion may occur as a result of a trigger condition. For example, the first access point may monitor for a change in RF signaling (e.g., a detected change in the second access point's transmit power or broadcast parameters, etc.) or receipt of a message from the second access point indicating that the operation has completed. Once this trigger condition is met, the reversion may be invoked.

Figure 3:
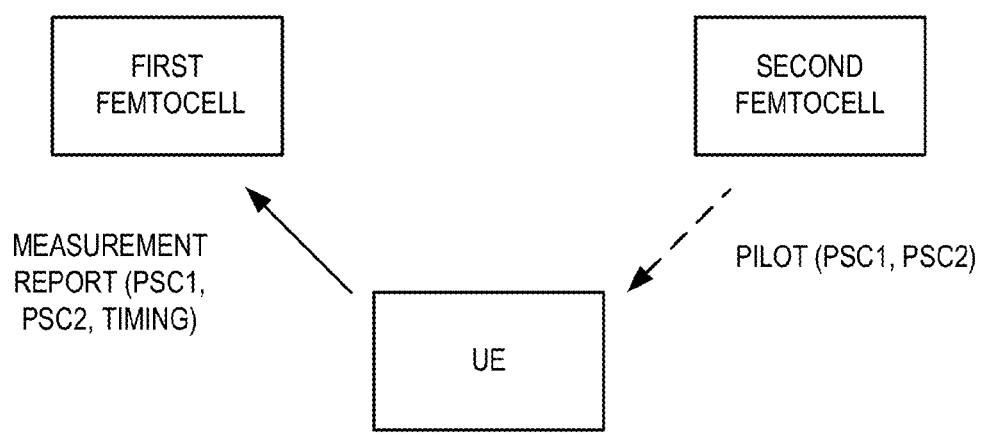
FIG. 3 is a simplified diagram illustrating an example of transmission of multiple physical layer identifiers.

Referring now to FIG. 3, an example of UMTS signaling that may be employed in the transmission of multiple physical layer identifiers as taught herein is described. In this case, an access terminal receives pilot signals from one access point and sends a measurement report to another access point. It should be appreciated that other signaling may be employed in other implementations. Also, the signaling may be received in different ways in other implementations. For example, an access point with an NLM may be able to directly receive pilots from another access point. In the example of FIG. 3, the access points are designated as femtocells and the access terminal is designated as a UE.

In accordance with the teachings herein, an access point may, at certain times, elect to transmit two or more PSCs at a certain time offset. That is, the different PSCs are transmitted at different system frame number (SFN) offsets and chip offsets. In the example of FIG. 3, the second femtocell transmits two PSCs with a certain time offset.

A UE in the vicinity of the second femtocell measures (e.g., detects) pilots from the second femtocell. For example, a UE moving towards the second femtocell will trigger an event (such as Event 1a) for all the PSCs if the received signals are of sufficient strength.

Each of these pilots is indicative of (e.g., is coded based on) a physical layer identifier used by the second femtocell. For example, one pilot may be coded using a first PSC (designated PSC1) and another pilot may be coded using a second PSC (designated PSC2). The UE also may receive other signals (e.g., messages) including other broadcast parameters used by the second femtocell (e.g., a cell identifier, a PCI, a LAC, a RAC, etc.).

After receiving the pilots, the UE sends a measurement report to the first femtocell (e.g., the femtocell that is currently serving the UE). The measurement report indicates that the UE has detected the different pilots. In this example, the measurement report includes PSC1 and PSC2. The UE may send these measurement reports periodically or based on some trigger (e.g., on demand).

The measurement report also includes other information relating to the second femtocell. For example, the measurement report also includes timing information (e.g., observed time difference (OTD) information) that indicates the relative timing of PSC1 and PSC2 (e.g., with respect to UE timing). In addition, the UE may report other broadcast parameters that the UE received from the second femtocell.

Upon receiving the measurement report with multiple PSCs, the first femtocell takes appropriate action depending on the particular PSCs that were received and/or the timing differences ($\Delta$OTD) between these PSCs. Here, the first femtocell may use the PSCs and/or the timing difference between the PSCs to determine the information the second femtocell is trying to communicate. That is, in the example of FIG. 2, the message from the second femtocell may be determined as a function of PSC1 and PSC2 and/or as a function of $\Delta OTD_{1,2}$.

One example of the information communicated by the second femtocell is a 'target cell identity', which is needed by a source femtocell to perform successful handover. That is, the identity (e.g., the cell identity) of the target femtocell may be mapped uniquely to one of the possible combinations of the transmitted PSCs and/or the time offset(s) between them. Thus, upon receiving the PSC and/or timing information, the source femtocell will be able to determine the cell identity of the target femtocell.

The following illustrates an example of the number of combinations that may be available through the use of the mapping scheme disclosed herein. For 'n' PSCs reserved on a frequency, the number of PSC combinations=C(n,2). The ΔSFN component in ΔOTD has 256 possible values (i.e., 0 to 255). The number of possible values for the $\Delta T_m$ (chip offset) component in ΔOTD is 38400 chips. Thus, the number of combinations possible is C(n,2)*256*38400.

Since a large number of combinations are available, it may be desirable to not use some of these combinations (especially, certain time offsets). In this way, the system may better account for inaccuracies in the UE measurement and allow for false detection by UEs. Here, a false detection may involve, for example, a UE measuring/reporting PSCs from two different neighboring femtocells, rather than from a single femtocell.

In UMTS, all of the PSCs transmitted by a target femtocell might not be present in the neighbor list of the source femtocell. This may be the case, for example, if an active UE is asked to measure and report 'detected set cells', i.e., the cells outside the neighbor list. Consequently, provisions may need to be made to ensure that the UE measures and reports all PSCs of interest.

With the above in mind, additional examples of operations relating to the above will now be described in more detail in conjunction with the flowcharts of FIGS. 4-7.

Figure 4:
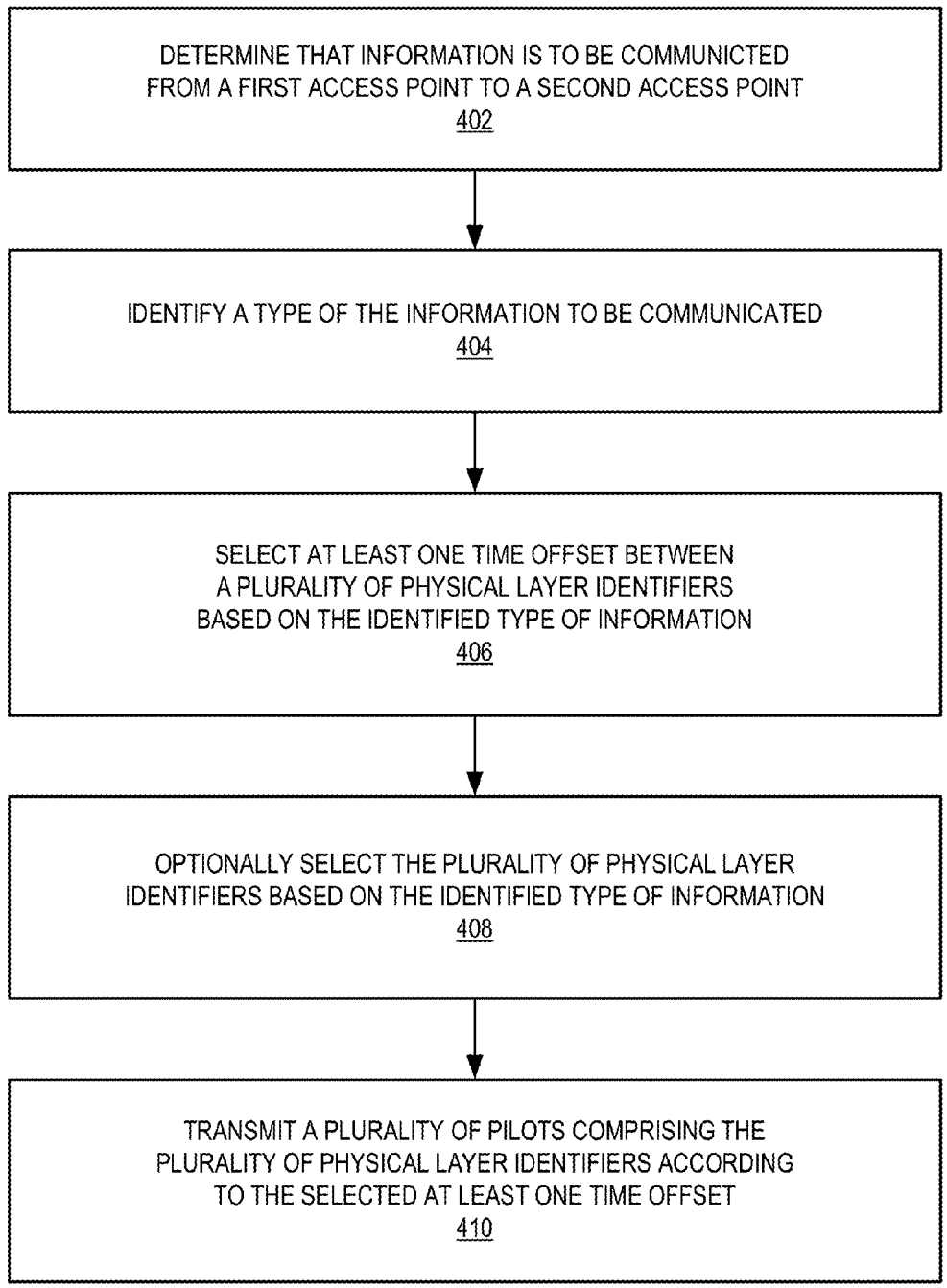
FIG. 4 is a flowchart of several sample aspects of operations that may be performed by an access point that transmits multiple physical layer identifiers according to at least one specifically selected time offset.

FIG. 4 illustrates sample operations that may be performed to convey information to another access point, where at least one time offset between the physical layer identifiers is selected to indicate the information being sent. Optionally, the specific physical layer identifiers used may be selected in combination with the time offset(s) to indicate the information being sent. These operations may be performed, for example, by a target access point as discussed above. In the example that follows, such a target access point is referred to as the first access point and a source access point is referred to as the second access point.

At some point in time, the first access point determines that it is to communicate with the second access point. For example, an event or a condition at the first access point may trigger the need to communicate with the second access point. Examples of such an event or condition include: a change in available resources, loading, or capabilities; a change in operating conditions; an alarm condition; a need to reconfigure transmission parameters or channels; observed interference, or a need to handover an access terminal.

In some embodiments, the determination that the first access point is to communicate with the second access point comprises identifying a type of information to be communicated. For example, the first access point may determine that it needs to communicate one or more of the types of information listed above to the second access point (e.g., to cause the second access point to invoke an action or actions corresponding to the information type(s)).

Accordingly, as represented by block 402, the first access point determines that information is to be communicated to the second access point. For example, a condition or event may occur at the first access point that triggers such communication as discussed herein.

As represented by block 404, the first access point identifies the type of the information to be communicated. The identified information may comprise a cell identifier of the first access point, a condition of the first access point, any of the information listed above, or some other type of information.

As represented by block 406, the first access point selects at least one time offset between a plurality of physical layer identifiers. For example, if two physical layer identifiers are used, a single time offset is selected; if three physical layer identifiers are used, two time offsets may be selected; and so on. Each time offset is defined, for example, by a system frame number (SFN) offset and a chip offset.

The selection of the time offset(s) is based on the type of information identified at block 404. For example, the first access point may select a time offset that is defined as being associated with a certain type of information (e.g., a load percentage). This association (e.g., corresponding to the mapping information described above at FIG. 2) may be provisioned for (e.g., in) the access points in a wireless communication system in a variety of ways. For example, this association may be provisioned by the network, provisioned upon deployment, or provisioned in some other suitable manner. In some cases, the time offset(s) used for the search is/are selected from a set of time offsets that have been defined for communicating information in the manner disclosed herein.

As represented by block 408, the first access point may optionally select the physical layer identifiers based on the type of information identified at block 404. For example, the first access point may select a pair of physical layer identifiers, where the combination of the selected time offset and the selected physical layer identifiers is defined as being associated with a certain type of information (e.g., a load percentage). This association may be provisioned for the access points as discussed above. Thus, when a particular type of information is to be communicated to the second access point, the first access point may select the time offset(s), and optionally the physical layer identifiers, defined as being associated with that particular type of information. In some cases, the physical layer identifiers used for the search are selected from a set of physical layer identifiers that have been defined for communicating information in the manner disclosed herein.

As represented by block 410, the first access point transmits a plurality of pilots comprising the plurality of physical layer identifiers according to the determined at least one time offset. For example, the first access point may encode each pilot using a corresponding one of the physical layer identifiers. That is, a first pilot is encoded using a first one of the physical layer identifiers, a second pilot is encoded using a second one of the physical layer identifiers, and so on. In addition, the first access point transmits the physical layer identifiers (e.g., the respective pilot codes) offset in time according to the at least one time offset selected at block 406.

From the above, it may be seen that the first access point selectively switches between the use of a single physical layer identifier for transmitting pilots (for normal operations) and the use of a plurality of physical layer identifiers for transmitting pilots (for communicating information). In some aspects, the switch to the use of the plurality of physical layer identifiers is triggered by the determination at block 402 that information is to be communicated to the second access point. In some cases, the plurality of physical layer identifiers are used for a defined (e.g., specified) period of time. For example, a switch to the use of the plurality of physical layer identifiers may be maintained for a defined period of time before a switch back to the use of a single physical layer identifier. Alternatively, the switch back may be trigger-based (e.g., once the first access point determines that the second access point received or acted on the communicated information).

The operations of FIG. 4 will be repeated whenever other information is to be communicated to the second access point. Of note, the pilots that communicate one type of information will comprise different physical layer identifiers and/or different time offset(s) than pilots that communicate other types of information. For example, upon determining that other information is to be communicated and identifying the other type of this information, at least one other time offset between a plurality of physical layer identifiers is selected based on identified other type. In addition, the specific physical layer identifiers to be used for the communication may be selected based on this other type of information. Pilots are then transmitted to the second access point according to the selected at least one other time offset (and, optionally, physical layer identifiers selected based on the information type).

Figure 5:
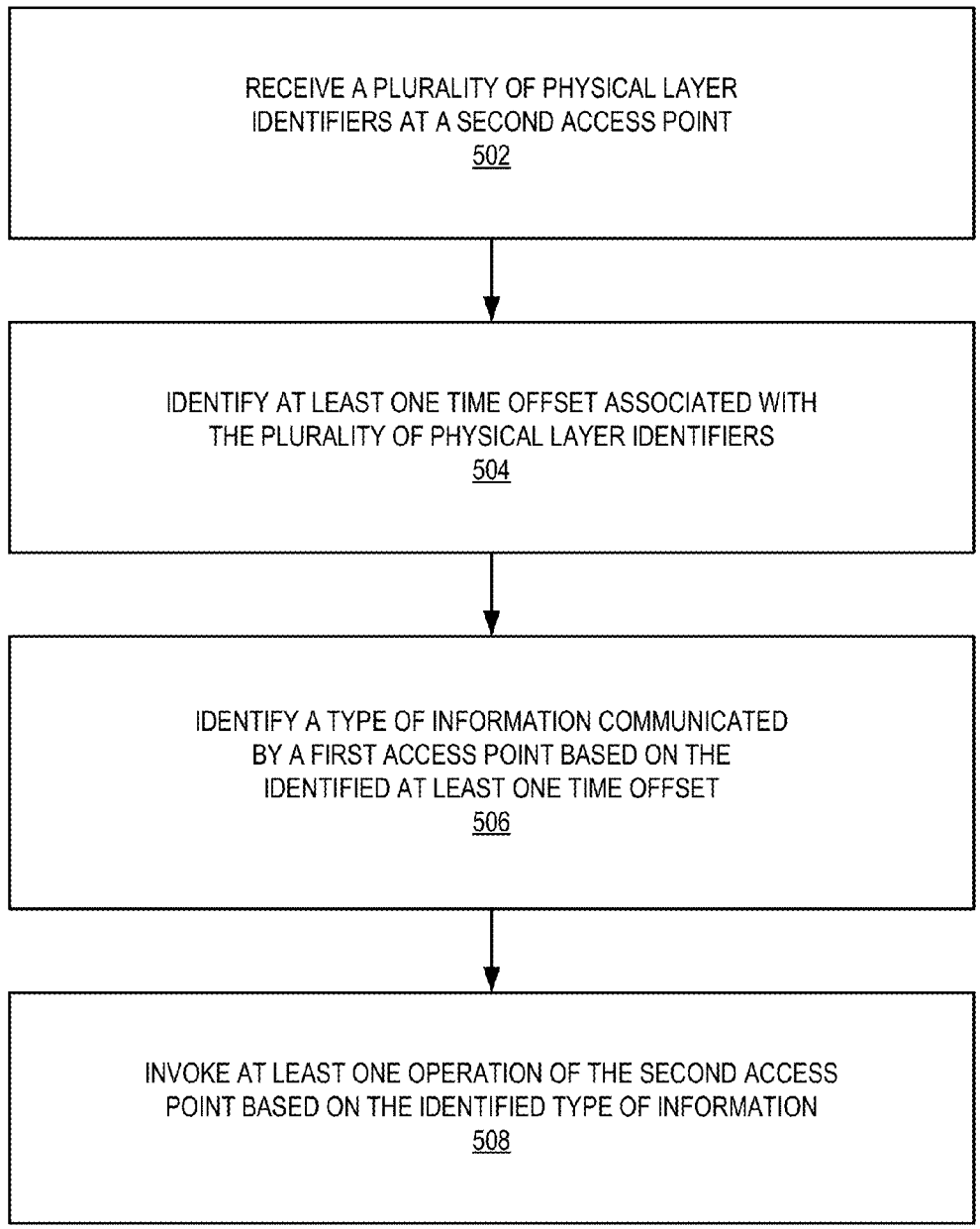
FIG. 5 is a flowchart of several sample aspects of operations that may be performed by an access point that receives multiple physical layer identifiers that were transmitted according to at least one specifically selected time offset.

FIG. 5 illustrates sample operations that may be performed at a recipient access point to, for example, identify communicated information based on the time offset(s) between received physical layer identifiers. Optionally, the specific physical layer identifiers that are received may be considered in combination with the time offset(s) to identify the received information. These operations may be performed, for example, by a source access point as discussed above. In the example that follows, the target access point is referred to as the first access point and the source access point is referred to as the second access point.

As represented by block 502, the second access point receives a plurality of physical layer identifiers. The received physical layer identifiers may correspond to, for example, the physical layer identifiers transmitted at block 410.

The second access point may receive these pilots either directly (e.g., using an NLM) or indirectly. As an example of the latter case, an access terminal in the vicinity may detect the pilots and transmit a measurement report including the physical layer identifiers and the corresponding timing information to its serving access point (the second access point).

As an example of the former case, to directly receive the pilots, the second access point may employ a search algorithm on received signals. Here, received signals are decoded using different physical layer identifiers to identify the physical layer identifier that decodes a given pilot. Thus, in some aspects, the second access point may decode a given one of the received pilots using a corresponding one of the physical layer identifiers. In some cases, the physical layer identifiers used for the search are selected from a set of physical layer identifiers that have been defined for communicating information in the manner disclosed herein (e.g., as discussed above).

As represented by block 504, the second access point identifies at least one time offset associated with the plurality of physical layer identifiers. For example, the second access point may extract the time offset information from a received measurement report message or determine the time offset information directly from received pilot signals. As mentioned above, each time offset may be defined by a SFN offset and a chip offset in some embodiments.

As represented by block 506, the second access point identifies a type of information communicated by a first access point. This identification is based on the at least one time offset identified at block 504. For example, as discussed above at block 406, a particular time offset may be defined as being associated with a certain type of information (e.g., a load percentage).

In some embodiments, the identification of the information communicated by the first access point is further based on the plurality of physical layer identifiers. For example, as discussed above at block 408, the combination of a particular time offset and a particular set of physical layer identifiers may be defined as being associated with a certain type of information (e.g., a load percentage).

As represented by block 508, the second access point invokes at least one operation based on the identified type of information. These operations may correspond, for example, to the operations listed above.

As discussed herein, upon receipt of physical layer identifiers having a particular time offset relationship, the second access point performs an operation or operations associated with that particular time offset relationship (e.g., via a mapping). For example, receipt of PSCs with a frame offset of 100 and a chip offset of 1000 may cause the second access point to, for example, change its transmit power. As another example, in an implementation where the PSCs are also specified based on the information, receipt of PSC-24 and PSC-37 with a frame offset of 100 and a chip offset of 1000 may cause the second access point to, for example, change its transmit power.

The operations of FIG. 5 will be repeated whenever other information is communicated to the second access point in the manner taught herein. Notably, received pilots that communicate one type of information may invoke a different operation at the second access point than received pilots that communicate other types of information. For example, upon receiving other physical layer identifiers, at least one other time offset associated with the other physical layer identifiers is identified. Then, the other type of information being communicated is identified based on the identified other time offset(s). In addition, this other type of information may be identified based on the specific physical layer identifiers used for the communication. At least one other operation may then be invoked at the second access point based on the identified other type of information.

Figure 6:
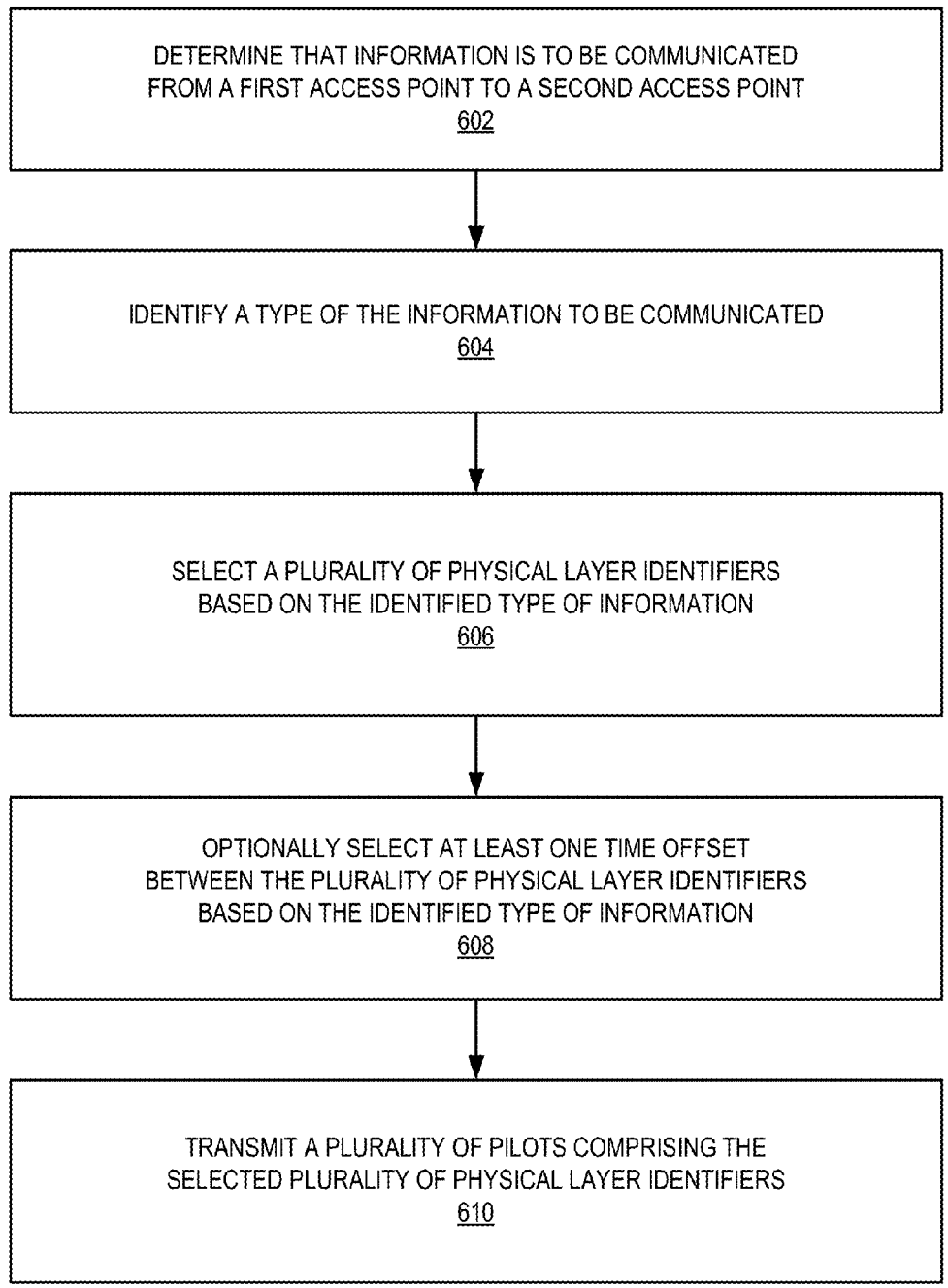
FIG. 6 is a flowchart of several sample aspects of operations that may be performed by an access point that transmits specifically selected physical layer identifiers.

FIG. 6 illustrates sample operations that may be performed to convey information to another access point, where the physical layer identifiers are selected to indicate the information being sent. Optionally, the time offset between the physical layer identifiers may be selected in combination with the physical layer identifiers to indicate the information being sent. These operations may be performed, for example, by a target access point as discussed above. In this case, the target access point is referred to as the first access point and the source access point is referred to as the second access point.

In a similar manner as discussed above at FIG. 4, the first access point is configured to selectively switch between use of a single physical layer identifier for pilot transmissions to the use of a plurality of physical layer identifiers. Again, after a switch, the plurality of physical layer identifiers may be used for pilot transmissions for a defined period of time or until a trigger causes a switch back to the use of the single physical layer identifier.

The operations of block 602 and 604 may be similar to the operations of blocks 402 and 404. Thus, the discussion of these operations will not be repeated.

As represented by block 606, the first access point selects the physical layer identifiers based on the type of information identified at block 604. The operations of block 606 may thus be similar in some aspects to the operations of block 408. Here, the first access point may select a set of physical layer identifiers that is defined as being associated with a certain type of information (e.g., a load percentage). This association (e.g., a mapping) may be provisioned in the access points in a variety of ways (e.g., provisioned by the network, provisioned upon deployment, etc.).

As represented by block 608, the first access point may optionally select at least one time offset between the plurality of physical layer identifiers based on the type of information identified at block 604. The operations of block 608 may thus be similar in some aspects to the operations of block 406. Here, the first access point may select a time offset, where the combination of the selected time offset and the selected physical layer identifiers is defined as being associated with a certain type of information (e.g., a load percentage).

As represented by block 610, the first access point transmits a plurality of pilots comprising the plurality of physical layer identifiers. The operation of block 610 is thus similar to the operation of block 410 whereby pilots may be encoded and transmitted based on the physical layer identifiers selected at block 606 (and, optionally, according to the time offset(s) selected at block 608).

The operations of FIG. 6 will be repeated whenever other information is to be communicated to the second access point. In a similar manner as discussed above at FIG. 4, upon identifying another type of information to be communicated, other physical layer parameters are selected based on this other information type. Pilots comprising the other physical layer identifiers (and, optionally, other time offset(s) based on the other type of information) are then transmitted to the second access point.

Figure 7:
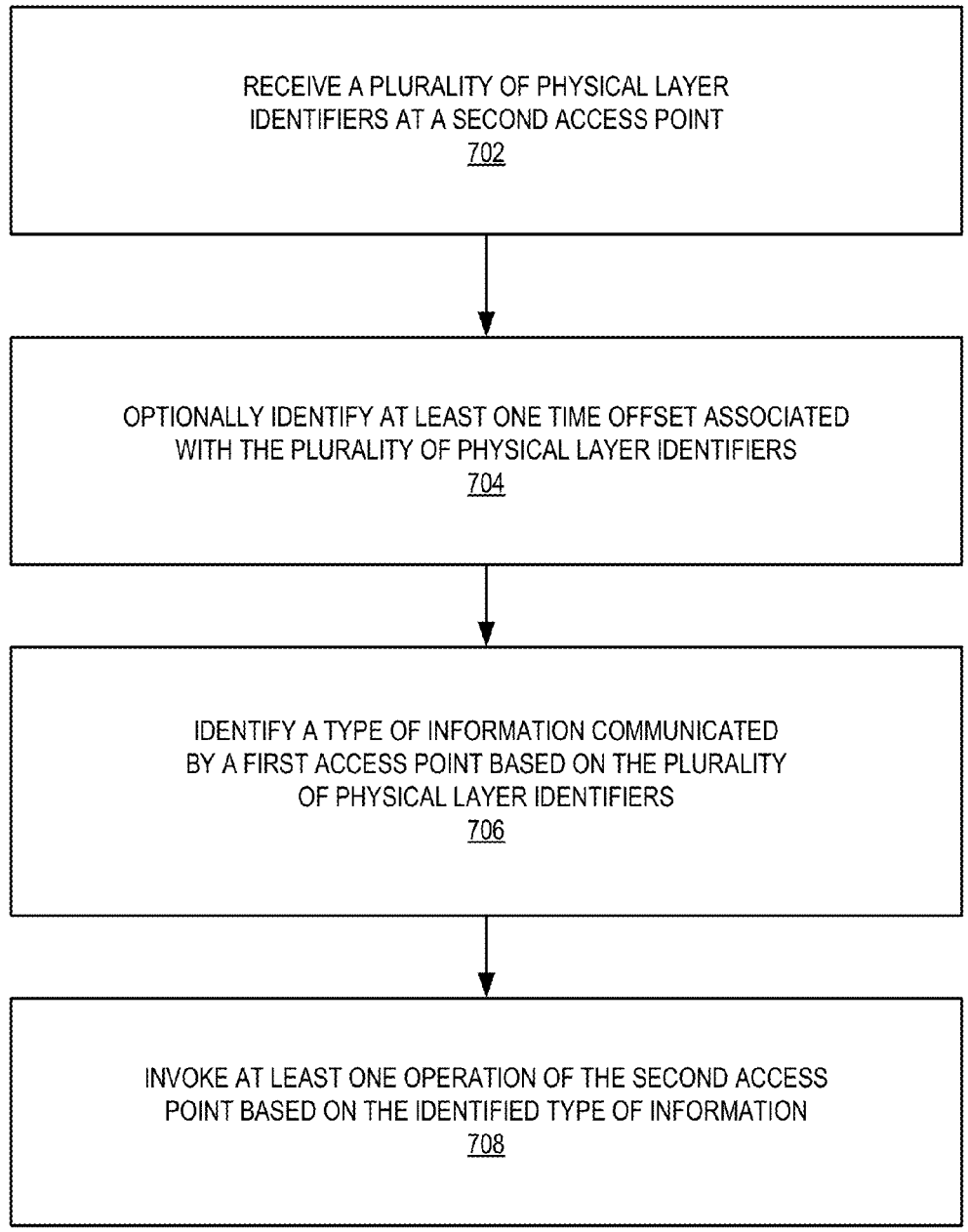
FIG. 7 is a flowchart of several sample aspects of operations that may be performed by an access point that receives physical layer identifiers that were specifically selected for transmission.

FIG. 7 illustrates sample operations that may be performed, for example, to identify communicated information based on the specific physical layer identifiers that were received at an access point. Optionally, the time offset between the received physical layer identifiers may be used in combination with the specific physical layer identifiers to identify the received information. These operations may be performed, for example, by a source access point as discussed above. In this example, the target access point is referred to as the first access point and the source access point is referred to as the second access point.

As represented by block 702, the second access point receives a plurality of physical layer identifiers. The operations of block 702 may be similar to the operations of block 502. Thus, the discussion of these operations will not be repeated.

As represented by block 704, the second access point may optionally identify at least one time offset associated with the plurality of physical layer identifiers received at block 702. The operations of block 704 may thus be similar to the operations of block 504.

As represented by block 706, the second access point identifies a type of information transmitted by a first access point. The identification of block 706 is based on the plurality of physical layer identifiers received at block 702. For example, as discussed above at block 606, a particular set of physical layer identifiers may be defined as being associated with a certain type of information (e.g., a load percentage).

In addition, in some embodiments, the identification of the information transmitted by the first access point is further based on the at least one time offset identified at block 704. For example, as discussed above at block 608, the combination of a particular time offset and a particular set of physical layer identifiers may be defined as being associated with a certain type of information (e.g., a load percentage).

As represented by block 708, the second access point invokes at least one operation based on the identified type of information. These operations may correspond, for example, to the operations listed above.

As discussed herein, upon receipt of particular physical layer identifiers, the second access point performs an operation or operations associated with those particular physical layer identifiers (e.g., via a mapping). For example, receipt of PSC-24 and PSC-37 may cause the second access point to, for example, change its transmit power. As another example, in an implementation where the time offset relationship of the PSCs is also specified based on the information, receipt of PSC-24 and PSC-37 with a frame offset of 100 and a chip offset of 1000 may cause the second access point to, for example, change its transmit power.

The operations of FIG. 7 will be repeated whenever other information is communicated to the second access point. In a similar manner as discussed above at FIG. 5, upon receiving other physical layer identifiers, the other type of information being communicated is identified based on the other physical layer identifiers. In addition, this other type of information may be identified based on at least one other time offset associated with the other physical layer identifiers. At least one other operation may then be invoked at the second access point based on the identified other information type.

Figure 8:
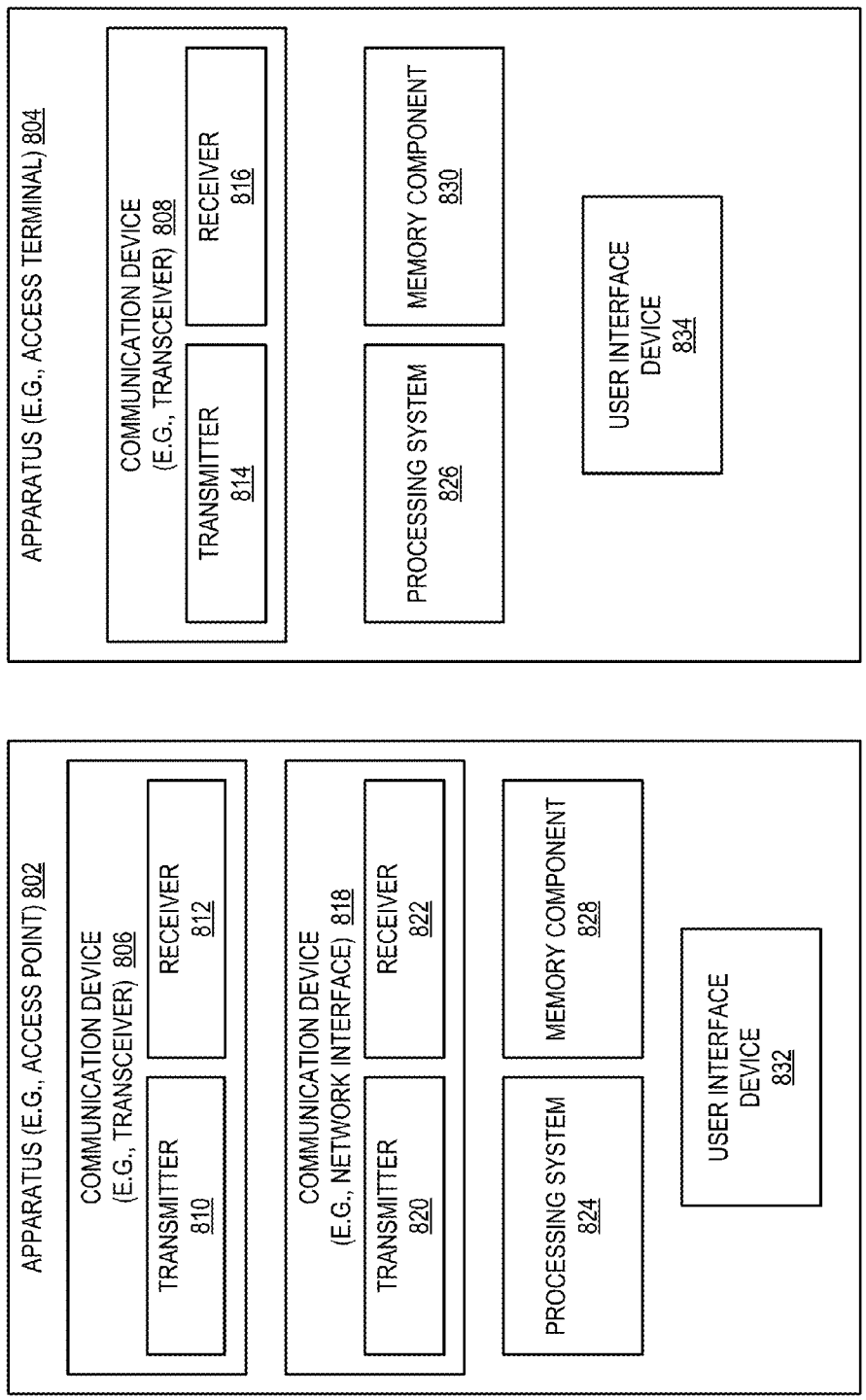
FIG. 8 is a simplified block diagram of several sample aspects of components that may be employed in communication nodes.

FIG. 8 illustrates several sample components (represented by corresponding blocks) that may be incorporated into an apparatus 802 and an apparatus 804 (e.g., corresponding to the access point 106 and the access terminal 104 of FIG. 1, respectively) to perform communication operations as taught herein. It should be appreciated that these components may be implemented in different types of apparatuses in different implementations (e.g., in an ASIC, in a system on a chip (SoC), etc.). The described components also may be incorporated into other apparatuses in a communication system. For example, other apparatuses in a system may include components similar to those described for the apparatus 802 to provide similar functionality. Also, a given apparatus may contain one or more of the described components. For example, an apparatus may include multiple transceiver components that enable the apparatus to operate on multiple carriers and/or communicate via different technologies.

The apparatus 802 and the apparatus 804 each include at least one wireless communication device (represented by the communication devices 806 and 808, respectively) for communicating with other nodes via at least one designated radio access technology. Each communication device 806 includes at least one transmitter (represented by the transmitter 810) for transmitting and encoding signals (e.g., messages, indications, information, pilots, and so on) and at least one receiver (represented by the receiver 812) for receiving and decoding signals (e.g., messages, indications, information, and so on). Similarly, each communication device 808 includes at least one transmitter (represented by the transmitter 814) for transmitting signals (e.g., messages, indications, information, and so on) and at least one receiver (represented by the receiver 816) for receiving signals (e.g., messages, indications, information, pilots, and so on). In some cases, a communication device (e.g., a receiver) is configured to identify at least one time offset associated with a plurality of received physical layer identifiers (e.g., received pilots). A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 802 comprises a network listen module.

The apparatus 802 includes at least one communication device (represented by the communication device 818) for communicating with other nodes. For example, the communication device 818 may comprise a network interface that is configured to communicate with one or more network entities via a wire-based or wireless backhaul. In some aspects, the communication device 818 may be implemented as a transceiver configured to support wire-based or wireless signal communication. This communication may involve, for example, sending and receiving: messages, parameters, or other types of information. Accordingly, in the example of FIG. 8, the communication device 818 is shown as comprising a transmitter 820 and a receiver 822.

The apparatus 802 and the apparatus 804 also include other components that may be used in conjunction with communication operations as taught herein. The apparatus 802 includes a processing system 824 for providing functionality relating to inter-access point communication and for providing other processing functionality. For example, the processing system 824 may perform at least one of: determining that information is to be communicated; identifying a type of information; selecting at least one time offset; selectively switching between use of a single physical layer identifier and use of the plurality of physical layer identifiers; selecting a plurality of physical layer identifiers; identifying at least one time offset; or invoking at least one operation. In addition, the apparatus 804 includes a processing system 826 for providing functionality relating to conducting measurement operations and sending measurement reports, and for providing other processing functionality. The apparatus 802 and the apparatus 804 include memory components 828 and 830 (e.g., each including a memory device), respectively, for maintaining information (e.g., thresholds, parameters, mapping information, and so on). In addition, the apparatus 802 and the apparatus 804 include user interface devices 832 and 834, respectively, for providing indications (e.g., audible and/or visual indications) to a user and/or for receiving user input (e.g., upon user actuation of a sensing device such a keypad, a touch screen, a microphone, and so on).

For convenience, the apparatus 802 is shown in FIG. 8 as including components that may be used in the various examples described herein. In practice, the illustrated blocks may have different functionality in different aspects. For example, the functionality of the block 824 for performing the operations of FIG. 4 may be different as compared to the functionality for performing the operations of FIG. 5.

The components of FIG. 8 may be implemented in various ways. In some implementations, the components of FIG. 8 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 806, 818, 824, 828, and 832 may be implemented by processor and memory component(s) of the apparatus 802 (e.g., by execution of appropriate code and/or by appropriate configuration of processor components). Similarly, some or all of the functionality represented by blocks 808, 826, 830, and 834 may be implemented by processor and memory component(s) of the apparatus 804 (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macrocell, and so on. Also, a femto access point may be configured or referred to as a Home NodeB, Home eNodeB, access point base station, femtocell, and so on. In some implementations, a node may be associated with (e.g., referred to as or divided into) one or more cells or sectors. A cell or sector associated with a macro access point, a femto access point, or a pico access point may be referred to as a macrocell, a femtocell, or a pico cell, respectively.

Figure 9:
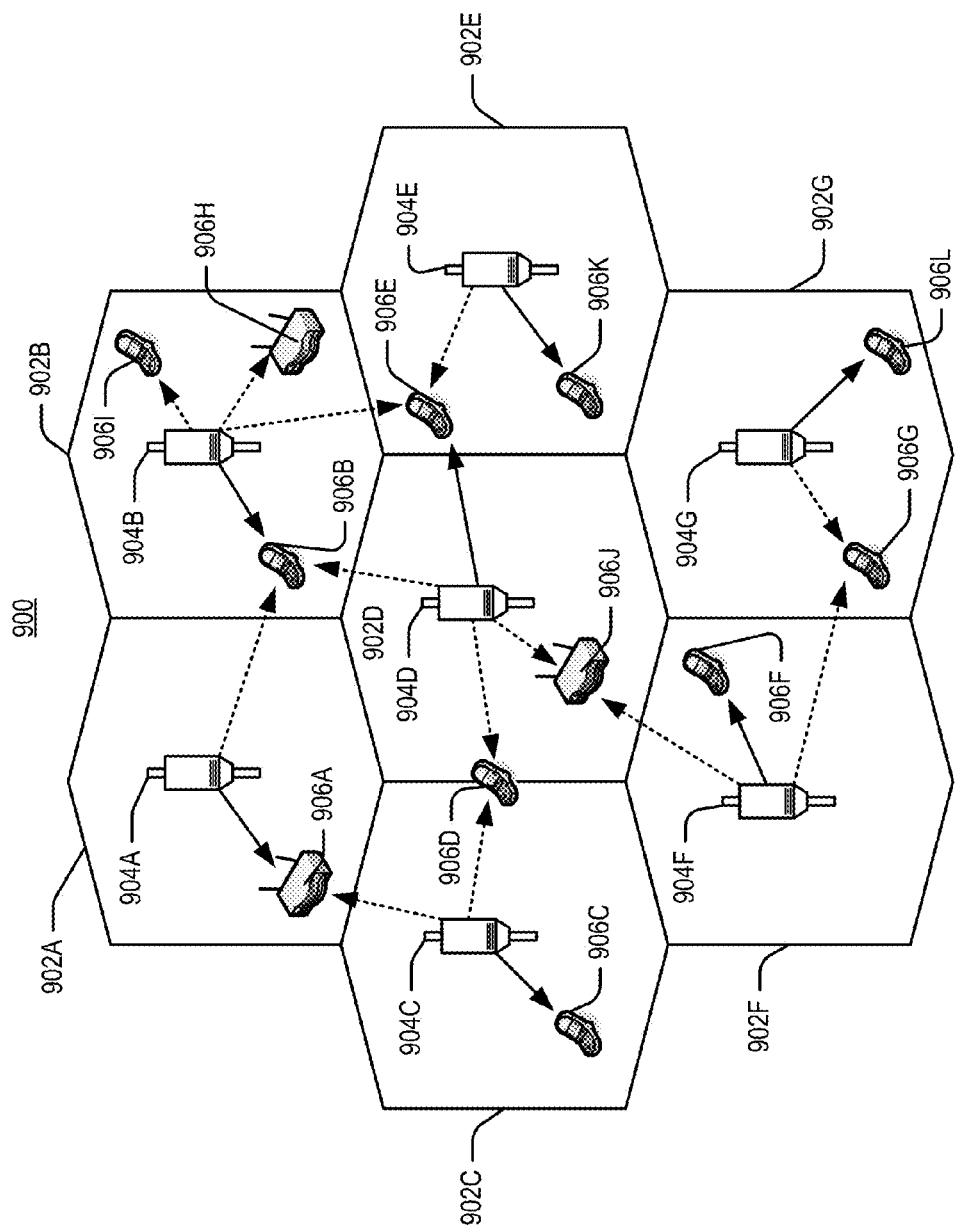
FIG. 9 is a simplified diagram of a wireless communication system.

FIG. 9 illustrates a wireless communication system 900, configured to support a number of users, in which the teachings herein may be implemented. The system 900 provides communication for multiple cells 902, such as, for example, macrocells 902A-902G, with each cell being serviced by a corresponding access point 904 (e.g., access points 904A-904G). As shown in FIG. 9, access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macrocells 902A-902G may cover a few blocks in a neighborhood or several miles in a rural environment.

Figure 10:
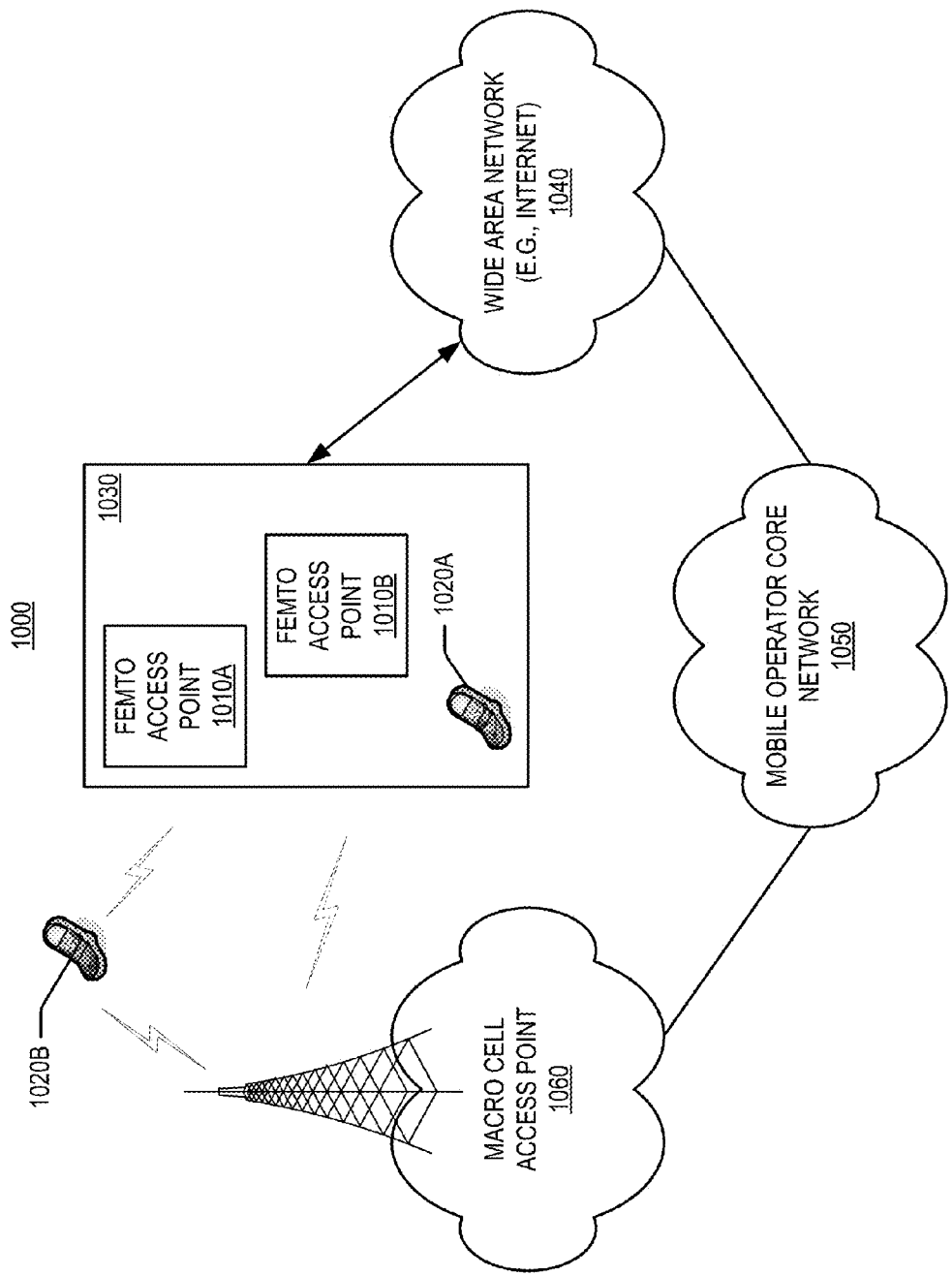
FIG. 10 is a simplified diagram of a wireless communication system including femto nodes.

FIG. 10 illustrates an exemplary communication system 1000 where one or more femto access points are deployed within a network environment. Specifically, the system 1000 includes multiple femto access points 1010 (e.g., femto access points 1010A and 1010B) installed in a relatively small scale network environment (e.g., in one or more user residences 1030). Each femto access point 1010 may be coupled to a wide area network 1040 (e.g., the Internet) and a mobile operator core network 1050 via a DSL router, a cable modem, a wireless link, or other connectivity means (not shown). As will be discussed below, each femto access point 1010 may be configured to serve associated access terminals 1020 (e.g., access terminal 1020A) and, optionally, other (e.g., hybrid or alien) access terminals 1020 (e.g., access terminal 1020B). In other words, access to femto access points 1010 may be restricted whereby a given access terminal 1020 may be served by a set of designated (e.g., home) femto access point(s) 1010 but may not be served by any non-designated femto access points 1010 (e.g., a neighbor's femto access point 1010).

Figure 11:
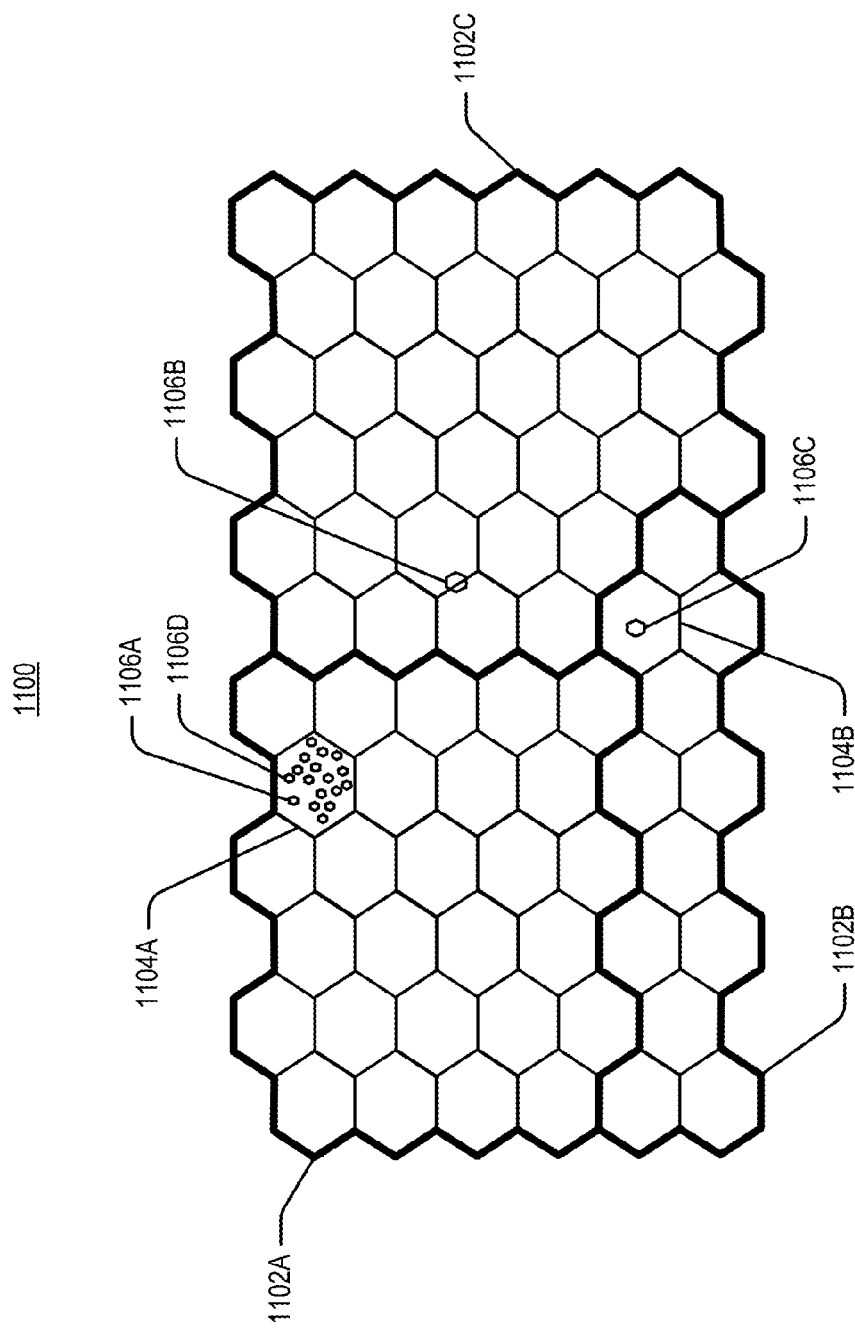
FIG. 11 is a simplified diagram illustrating coverage areas for wireless communication.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the larger hexagons. The tracking areas 1102 also include femto coverage areas 1106. In this example, each of the femto coverage areas 1106 (e.g., femto coverage areas 1106B and 1106C) is depicted within one or more macro coverage areas 1104 (e.g., macro coverage areas 1104A and 1104B). It should be appreciated, however, that some or all of a femto coverage area 1106 might not lie within a macro coverage area 1104. In practice, a large number of femto coverage areas 1106 (e.g., femto coverage areas 1106A and 1106D) may be defined within a given tracking area 1102 or macro coverage area 1104. Also, one or more pico coverage areas (not shown) may be defined within a given tracking area 1102 or macro coverage area 1104.

Referring again to FIG. 10, the owner of a femto access point 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macrocell access point 1060 associated with the mobile operator core network 1050 or by any one of a set of femto access points 1010 (e.g., the femto access points 1010A and 1010B that reside within a corresponding user residence 1030). For example, when a subscriber is outside his home, he is served by a standard macro access point (e.g., access point 1060) and when the subscriber is at home, he is served by a femto access point (e.g., access point 1010A). Here, a femto access point 1010 may be backward compatible with legacy access terminals 1020.

A femto access point 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred femto access point (e.g., the home femto access point of the access terminal 1020) whenever such connectivity is possible. For example, whenever the access terminal 1020A is within the user's residence 1030, it may be desired that the access terminal 1020A communicate only with the home femto access point 1010A or 1010B.

In some aspects, if the access terminal 1020 operates within the mobile operator core network 1050 but is not residing on its most preferred network (e.g., as defined in a preferred roaming list), the access terminal 1020 may continue to search for the most preferred network (e.g., the preferred femto access point 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1010, the access terminal 1020 selects the femto access point 1010 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macrocell mobile network and a defined set of femto access points (e.g., the femto access points 1010 that reside within the corresponding user residence 1030). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
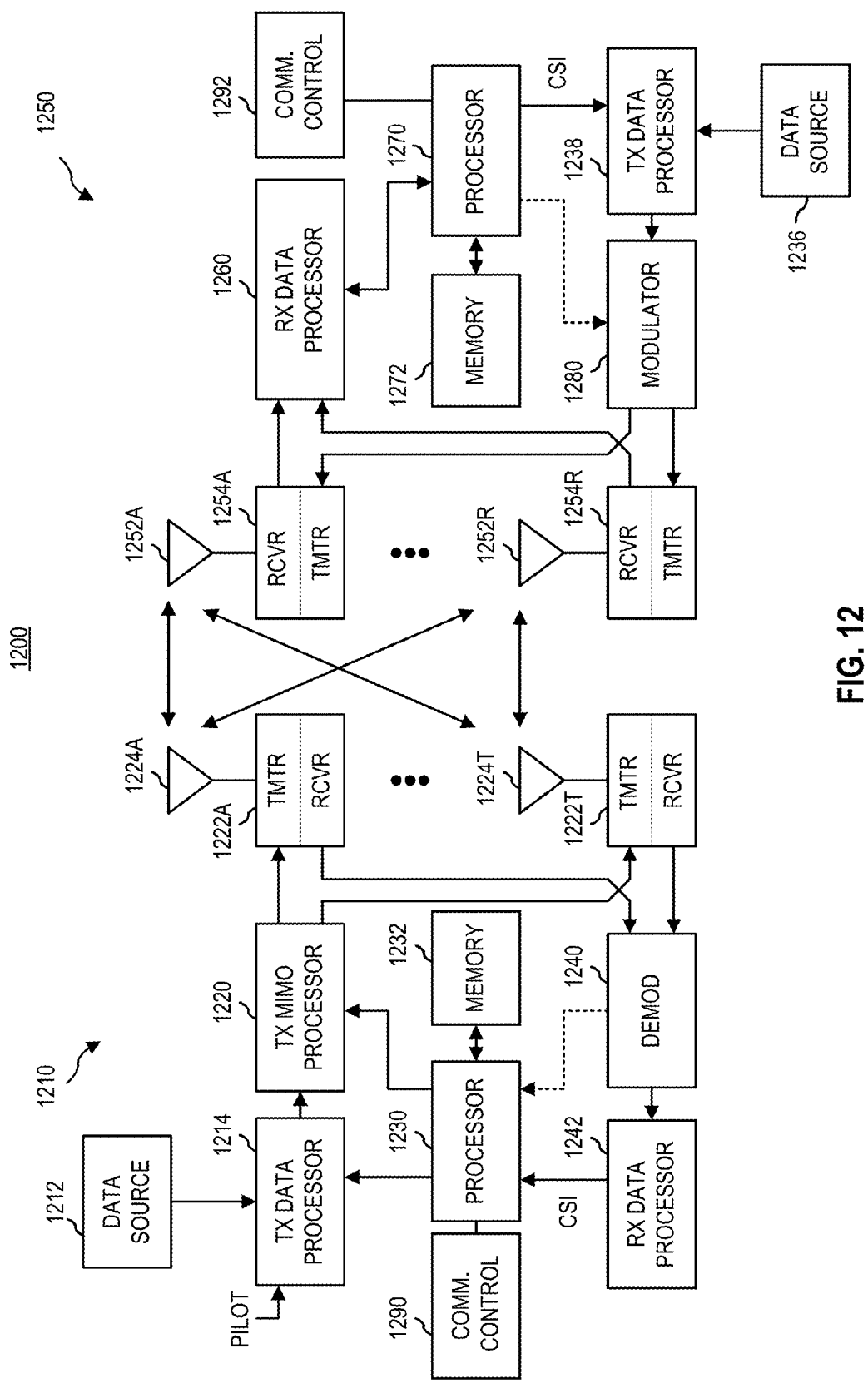
FIG. 12 is a simplified block diagram of several sample aspects of communication components.

FIG. 12 illustrates a wireless device 1210 (e.g., an access point) and a wireless device 1250 (e.g., an access terminal) of a sample MIMO system 1200. At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform communication (COMM.) control operations as taught herein. For example, a communication control component 1290 may cooperate with the processor 1230 and/or other components of the device 1210 to send signals (e.g., pilots) to and receive signals (e.g., measurement reports) from another device (e.g., device 1250). Similarly, a communication control component 1292 may cooperate with the processor 1270 and/or other components of the device 1250 to convey signals to/from another device (e.g., device 1210) as taught herein. It should be appreciated that for each device 1210 and 1250 the functionality of two or more of the described components may be provided by a single component. For example, a single processing component may provide the functionality of the communication control component 1290 and the processor 1230 and a single processing component may provide the functionality of the communication control component 1292 and the processor 1270.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macrocell, a macro node, a Home eNB (HeNB), a femtocell, a femto node, a pico node, or some other similar terminology.

In some aspects, a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

In addition, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects, the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims.

Figure 13:
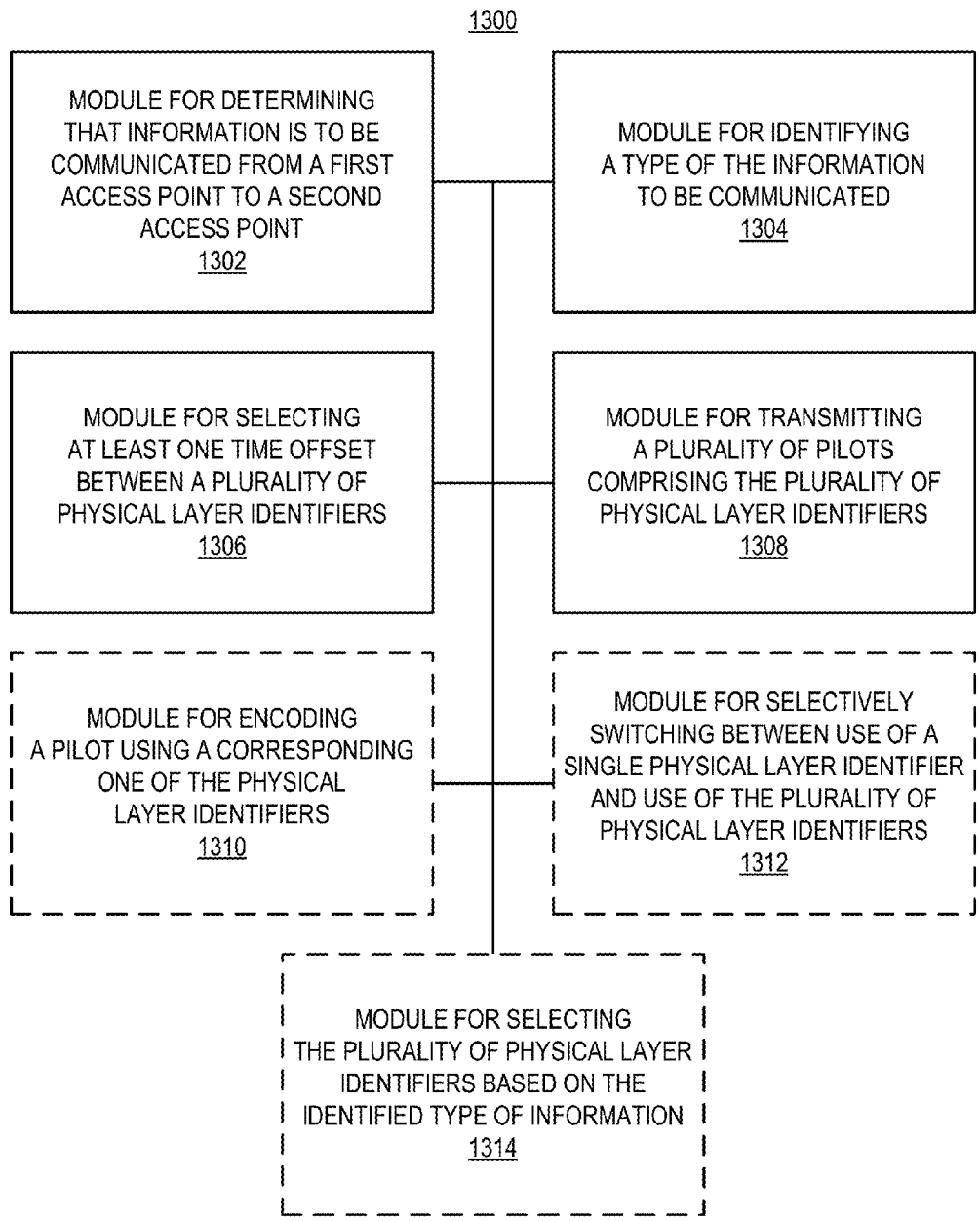
FIGS. 13, 14, 15, and 16 are simplified block diagrams of several sample aspects of apparatuses configured to facilitate inter-access point communication as taught herein.

Referring to FIG. 13, an apparatus 1300 is represented as a series of interrelated functional modules. A module for determining that information is to be communicated from a first access point to a second access point 1302 may correspond at least in some aspects to, for example, a processing system as discussed herein. A module for identifying a type of the information to be communicated 1304 may correspond at least in some aspects to, for example, a processing system as discussed herein. A module for selecting at least one time offset between a plurality of physical layer identifiers 1306 may correspond at least in some aspects to, for example, a processing system as discussed herein. A module for transmitting a plurality of pilots comprising the plurality of physical layer identifiers 1308 may correspond at least in some aspects to, for example, a transmitter or communication device as discussed herein. A module for encoding a pilot using a corresponding one of the physical layer identifiers 1310 may correspond at least in some aspects to, for example, a transmitter or communication device as discussed herein. A module for selectively switching between use of a single physical layer identifier and use of the plurality of physical layer identifiers 1312 may correspond at least in some aspects to, for example, a processing system as discussed herein. A module for selecting the plurality of physical layer identifiers based on the identified type of information 1314 may correspond at least in some aspects to, for example, a processing system as discussed herein.

Figure 14:
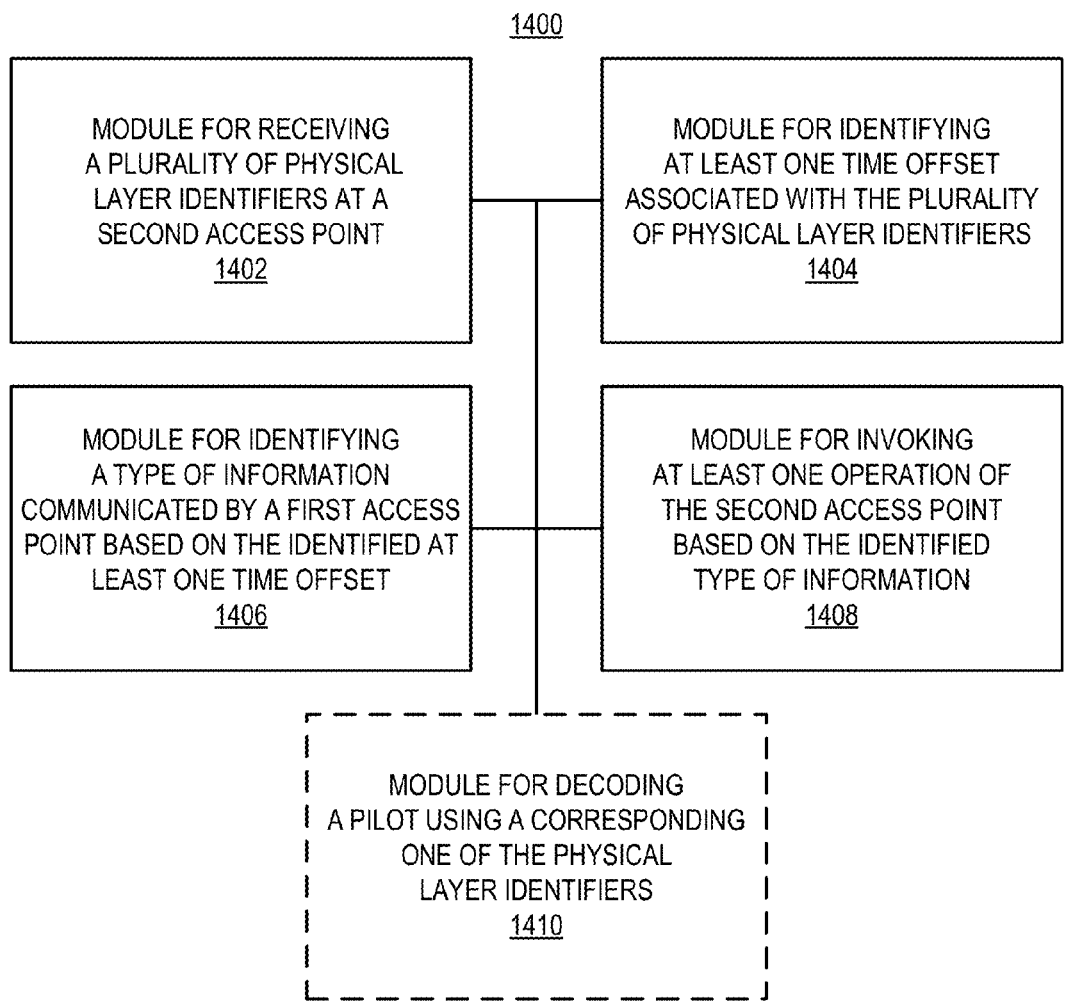

Referring to FIG. 14, an apparatus 1400 is represented as a series of interrelated functional modules. A module for receiving a plurality of physical layer identifiers at a second access point 1402 may correspond at least in some aspects to, for example, a receiver or communication device as discussed herein. A module for identifying at least one time offset associated with the plurality of physical layer identifiers 1404 may correspond at least in some aspects to, for example, a receiver or communication device as discussed herein. A module for identifying a type of information communicated by a first access point based on the identified at least one time offset 1406 may correspond at least in some aspects to, for example, a processing system as discussed herein. A module for invoking at least one operation of the second access point based on the identified type of information 1408 may correspond at least in some aspects to, for example, a processing system as discussed herein. A module for decoding a pilot using a corresponding one of the physical layer identifiers 1410 may correspond at least in some aspects to, for example, a receiver or communication device as discussed herein.

Figure 15:
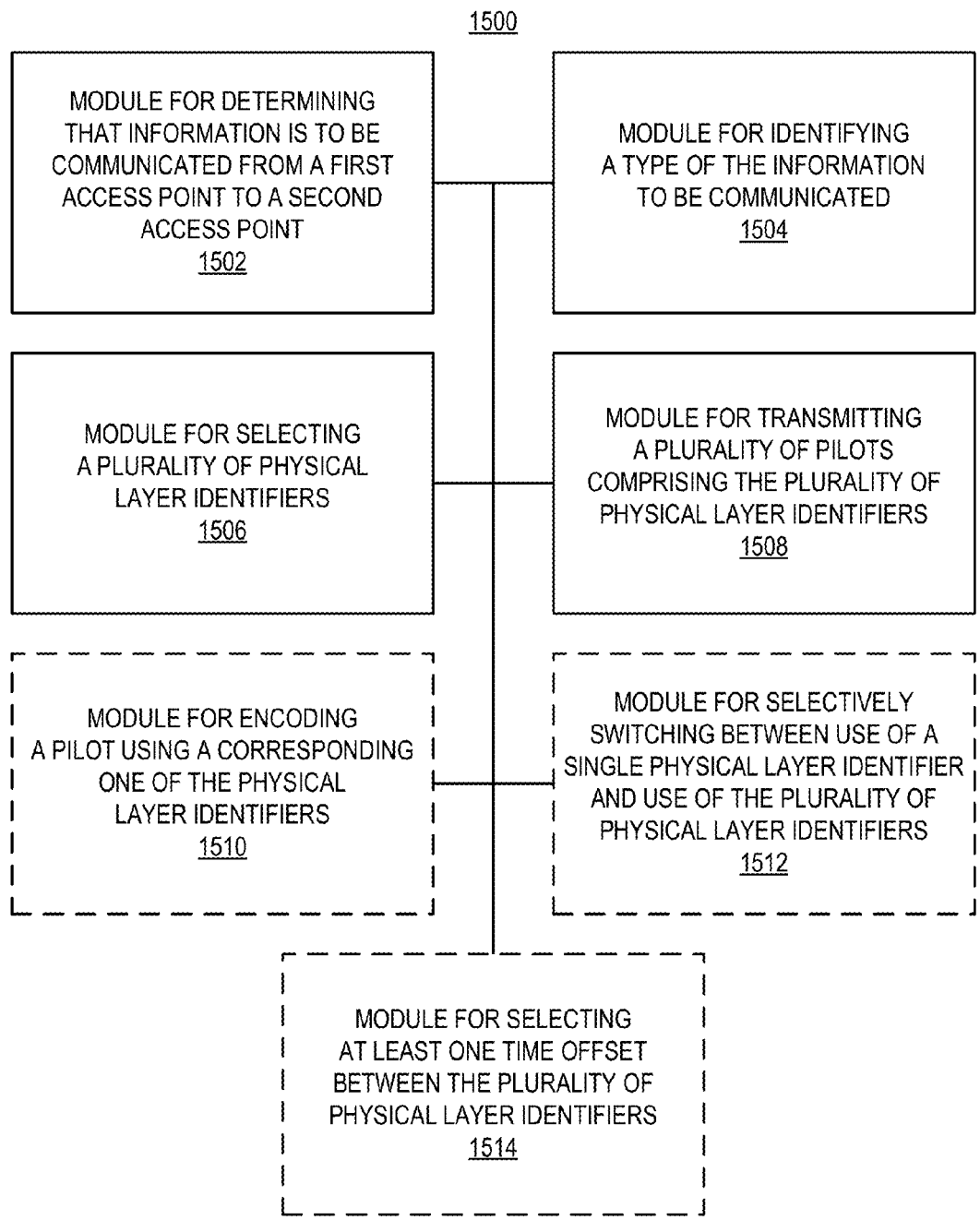

Referring to FIG. 15, an apparatus 1500 is represented as a series of interrelated functional modules. A module for determining that information is to be communicated from a first access point to a second access point 1502 may correspond at least in some aspects to, for example, a processing system as discussed herein. A module for identifying a type of the information to be communicated 1504 may correspond at least in some aspects to, for example, a processing system as discussed herein. A module for selecting a plurality of physical layer identifiers 1506 may correspond at least in some aspects to, for example, a processing system as discussed herein. A module for transmitting a plurality of pilots comprising the plurality of physical layer identifiers 1508 may correspond at least in some aspects to, for example, a transmitter or communication device as discussed herein. A module for encoding a pilot using a corresponding one of the physical layer identifiers 1510 may correspond at least in some aspects to, for example, a transmitter or communication device as discussed herein. A module for selectively switching between use of a single physical layer identifier and use of the plurality of physical layer identifiers 1512 may correspond at least in some aspects to, for example, a processing system as discussed herein. A module for selecting at least one time offset between the plurality of physical layer identifiers 1514 may correspond at least in some aspects to, for example, a processing system as discussed herein.

Figure 16:
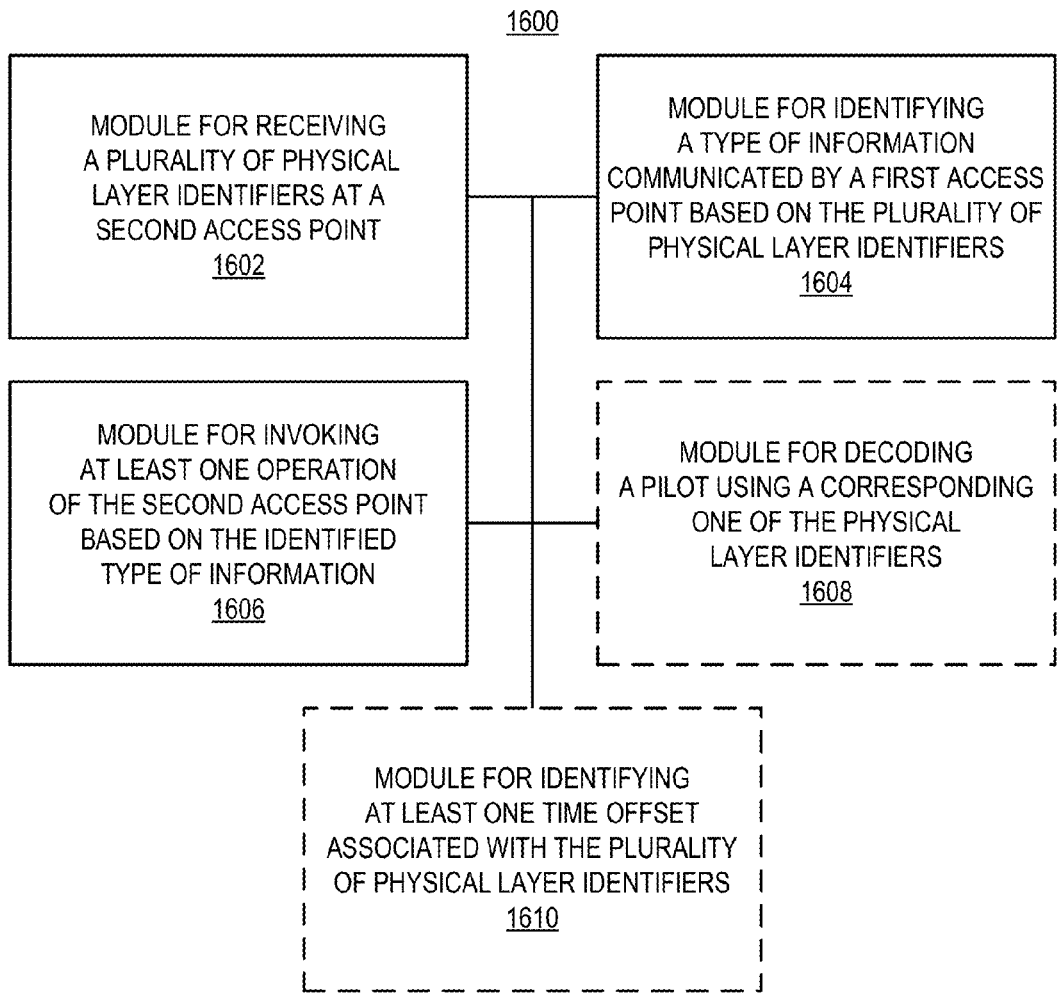

Referring to FIG. 16, an apparatus 1600 is represented as a series of interrelated functional modules. A module for receiving a plurality of physical layer identifiers at a second access point 1602 may correspond at least in some aspects to, for example, a receiver or communication device as discussed herein. A module for identifying a type of information communicated by a first access point based on the plurality of physical layer identifiers 1604 may correspond at least in some aspects to, for example, a receiver or communication device as discussed herein. A module for invoking at least one operation of the second access point based on the identified type of information 1606 may correspond at least in some aspects to, for example, a processing system as discussed herein. A module for decoding a pilot using a corresponding one of the physical layer identifiers 1608 may correspond at least in some aspects to, for example, a receiver or communication device as discussed herein. A module for identifying at least one time offset associated with the plurality of physical layer identifiers 1610 may correspond at least in some aspects to, for example, a processing system as discussed herein.

The functionality of the modules of FIGS. 13-16 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. As one specific example, the apparatus 1400 may comprise a single device (e.g., modules 1402-1410 comprising different sections of an ASIC). As another specific example, the apparatus 1400 may comprise several devices (e.g., the modules 1402 and 1410 comprising one ASIC and the modules 1404-1408 comprising another ASIC). The functionality of these modules also may be implemented in some other manner as taught herein. In some aspects one or more of any dashed blocks in FIGS. 13-16 are optional.

In addition, the components and functions represented by FIGS. 13-16 as well as other components and functions described herein, may be implemented using any suitable means. Such means also may be implemented, at least in part, using corresponding structure as taught herein. For example, the components described above in conjunction with the "module for" components of FIGS. 13-16 also may correspond to similarly designated "means for" functionality. Thus, in some aspects one or more of such means may be implemented using one or more of processor components, integrated circuits, or other suitable structure as taught herein. Several examples follow. In some aspects, means for determining comprises a processing system. In some aspects, means for selecting comprises a processing system. In some aspects, means for identifying comprises a communication device. In some aspects, means for invoking comprises a processing system. In some aspects, means for receiving comprises a receiver or communication device. In some aspects, means for transmitting comprises a transmitter or communication device. In some aspects, means for selectively switching comprises a processing system. In some aspects, means for encoding comprises a transmitter or communication device. In some aspects, means for decoding comprises a receiver or communication device.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code(s) executable (e.g., executable by at least one computer) to provide functionality relating to one or more of the aspects of the disclosure. In some aspects, a computer program product may comprise packaging materials.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for communication, comprising:
   a processing system configured to:
      determine that information is to be communicated from a first access point to a second access point,
      selectively switch between use of a single physical layer identifier for pilot transmissions and use of a plurality of physical layer identifiers for pilot transmissions where the information is indicated by at least one time offset between the plurality of physical layer identifiers,
      identify a type of the information to be communicated, and
      select the at least one time offset between the plurality of physical layer identifiers, wherein the selection is based on the identified type of information; and
   a communication device configured to transmit a plurality of pilots comprising the plurality of physical layer identifiers according to the selected at least one time offset.

2. The apparatus of claim 1, wherein the communication device is further configured to, for each of the transmitted pilots, encode the pilot using a corresponding one of the physical layer identifiers.

3. The apparatus of claim 1, wherein a switch to the use of the plurality of physical layer identifiers for pilot transmissions is triggered by the determination that information is to be communicated.

4. The apparatus of claim 1, wherein a switch to the use of the plurality of physical layer identifiers for pilot transmissions is maintained for a defined period of time before a switch back to the use of a single physical layer identifier for pilot transmissions.

5. The apparatus of claim 1, wherein:
   the processing system is further configured to:
      identify another type of information to be communicated from the first access point to the second access point, and
      select at least one other time offset between the plurality of physical layer identifiers, wherein the selection of the at least one other time offset is based on the identified other type of information; and
   the communication device is further configured to transmit a plurality of other pilots comprising the plurality of physical layer identifiers according to the selected at least one other time offset.

6. The apparatus of claim 1, wherein the processing system is further configured to select the plurality of physical layer identifiers based on the identified type of information.

7. The apparatus of claim 1, wherein the at least one time offset is defined by a system frame number (SFN) offset and a chip offset.

8. The apparatus of claim 1, wherein the identified type of information comprises a cell identifier of the first access point.

9. The apparatus of claim 1, wherein the identified type of information specifies at least one operating condition at the first access point.

10. The apparatus of claim 9, wherein the at least one operating condition comprises at least one of: load information for the first access point; at least one capability supported by the first access point; availability of at least one resource of the first access point; or an alarm condition at the first access point.

11. The apparatus of claim 1, wherein the identified type of information comprises an indication of physical layer identifier confusion in a neighborhood of the first access point.

12. The apparatus of claim 1, wherein the identified type of information comprises at least one request to the second access point.

13. The apparatus of claim 12, wherein the at least one request to the second access point comprises at least one of: a request to change at least one parameter at the second access point, a request to turn off the second access point, a request to reboot the second access point, a request to accept handover of an access terminal, or a request to commence transmission on a specified channel.

14. The apparatus of claim 13, wherein the at least one parameter relates to at least one of: a primary scrambling code (PSC), a physical cell identity (PCI), a random access channel (RACH) parameter, a location area code (LAC), a routing area code (RAC), a tracking area code (TAC), a closed subscriber group identifier (CSG ID), a CSG Indicator, a SIB schedule, invoking transmission of an additional SIB, a transmit power, an access restriction, or an access mode.

15. A method of communication, comprising:
   determining that information is to be communicated from a first access point to a second access point;
   selectively switching between use of a single physical layer identifier for pilot transmissions and use of a plurality of physical layer identifiers for pilot transmissions where the information is indicated by at least one time offset between the plurality of physical layer identifiers;
   identifying a type of the information to be communicated;
   selecting the at least one time offset between the plurality of physical layer identifiers, wherein the selection is based on the identified type of information; and
   transmitting a plurality of pilots comprising the plurality of physical layer identifiers according to the selected at least one time offset.

16. The method of claim 15, further comprising, for each of the transmitted pilots, encoding the pilot using a corresponding one of the physical layer identifiers.

17. The method of claim 15, wherein a switch to the use of the plurality of physical layer identifiers for pilot transmissions is triggered by the determination that information is to be communicated.

18. The method of claim 15, wherein a switch to the use of the plurality of physical layer identifiers for pilot transmissions is maintained for a defined period of time before a switch back to the use of a single physical layer identifier for pilot transmissions.

19. The method of claim 15, further comprising:
   identifying another type of information to be communicated from the first access point to the second access point;

selecting at least one other time offset between the plurality of physical layer identifiers, wherein the selection of the at least one other time offset is based on the identified other type of information; and
transmitting a plurality of other pilots comprising the plurality of physical layer identifiers according to the selected at least one other time offset.

20. The method of claim 15, further comprising selecting the plurality of physical layer identifiers based on the identified type of information.

21. An apparatus for communication, comprising:
means for determining that information is to be communicated from a first access point to a second access point;
means for selectively switching between use of a single physical layer identifier for pilot transmissions and use of a plurality of physical layer identifiers for pilot transmissions where the information is indicated by at least one time offset between the plurality of physical layer identifiers;
means for identifying a type of the information to be communicated;
means for selecting the at least one time offset between the plurality of physical layer identifiers, wherein the selection is based on the identified type of information; and
means for transmitting a plurality of pilots comprising the plurality of physical layer identifiers according to the selected at least one time offset.

22. The apparatus of claim 21, further comprising means for, for each of the transmitted pilots, encoding the pilot using a corresponding one of the physical layer identifiers.

23. The apparatus of claim 21, further comprising means for selecting the plurality of physical layer identifiers based on the identified type of information.

24. A non-transitory computer-readable medium comprising code for causing a computer to:
determine that information is to be communicated from a first access point to a second access point;
selectively switch between use of a single physical layer identifier for pilot transmissions and use of a plurality of physical layer identifiers for pilot transmissions where the information is indicated by at least one time offset between the plurality of physical layer identifiers;
identify a type of the information to be communicated;
select the at least one time offset between the plurality of physical layer identifiers, wherein the selection is based on the identified type of information; and
transmit a plurality of pilots comprising the plurality of physical layer identifiers according to the selected at least one time offset.

25. An apparatus for communication, comprising:
a communication device configured to receive a plurality of pilots comprising a plurality of physical layer identifiers from a first access point at a second access point; and
a processing system configured to:
selectively switch between processing each of the plurality of received pilots independently and processing the plurality of received pilots to obtain information indicated by at least one time offset between the plurality of physical layer identifiers,
identify the at least one time offset between the plurality of physical layer identifiers,
identify a type of information communicated by the first access point, wherein the identification of the type of information is based on the identified at least one time offset, and
invoke at least one operation of the second access point based on the identified type of information.

26. The apparatus of claim 25, wherein the communication device is further configured to, for each of the plurality of received pilots, decode the pilot using a corresponding one of the physical layer identifiers.

27. The apparatus of claim 25, wherein:
the communication device is further configured to receive a plurality of other physical layer identifiers at the second access point; and
the processing system is further configured to:
identify at least one other time offset associated with the plurality of other physical layer identifiers,
identify another type of information communicated by the first access point based on the identified at least one other time offset, and
invoke at least one other operation of the second access point based on the identified other type of information.

28. The apparatus of claim 25, wherein the identification of the type of information communicated by the first access point is further based on the plurality of physical layer identifiers.

29. The apparatus of claim 25, wherein the at least one time offset is defined by a system frame number (SFN) offset and a chip offset.

30. The apparatus of claim 25, wherein the at least one operation comprises adjusting a transmit power of the second access point.

31. The apparatus of claim 25, wherein the at least one operation comprises changing at least one broadcast parameter used by the second access point.

32. The apparatus of claim 31, wherein the at least one broadcast parameter relates to at least one of: a primary scrambling code (PSC), a physical cell identity (PCI), a random access channel (RACH) parameter, a location area code (LAC), a routing area code (RAC), a tracking area code (TAC), a closed subscriber group identifier (CSG ID), a CSG Indicator, a SIB schedule, or invoking transmission of an additional SIB.

33. The apparatus of claim 25, wherein the at least one operation comprises transmitting on another channel.

34. The apparatus of claim 25, wherein the at least one operation comprises at least one of:
changing an access restriction of the second access point;
changing an access mode of the second access point;
sending a message to the first access point;
turning off the second access point;
rebooting the second access point; or
accepting specified messages via a backhaul.

35. The apparatus of claim 34, wherein:
the sent message relates to changing a physical layer parameter;
the sent message relates to changing an upper layer parameter;
the sent message relates to acknowledging monitoring of uplink transmissions from an access terminal; and
the specified messages are handover-related messages.

36. The apparatus of claim 25, wherein the identified type of information comprises a cell identifier of the first access point.

37. The apparatus of claim 25, wherein the identified type of information specifies at least one operating condition at the first access point.

38. The apparatus of claim 25, wherein the identified type of information comprises an indication of physical layer identifier confusion in a neighborhood of the first access point.

39. The apparatus of claim 25, wherein the identified type of information comprises at least one request to the second access point.

40. A method of communication, comprising:
- receiving a plurality of pilots comprising a plurality of physical layer identifiers from a first access point at a second access point;
- selectively switching between processing each of the plurality of received pilots independently and processing the plurality of received pilots to obtain information indicated by at least one time offset between the plurality of physical layer identifiers;
- identifying the at least one time offset between the plurality of physical layer identifiers;
- identifying a type of information communicated by the first access point, wherein the identification of the type of information is based on the identified at least one time offset; and
- invoking at least one operation of the second access point based on the identified type of information.

41. The method of claim 40, further comprising, for each of the plurality of received pilots, decoding the pilot using a corresponding one of the physical layer identifiers.

42. The method of claim 40, further comprising:
- receiving a plurality of other physical layer identifiers at the second access point;
- identifying at least one other time offset associated with the plurality of other physical layer identifiers;
- identifying another type of information communicated by the first access point based on the identified at least one other time offset; and
- invoking at least one other operation of the second access point based on the identified other type of information.

43. The method of claim 40, wherein the identification of the type of information communicated by the first access point is further based on the plurality of physical layer identifiers.

44. An apparatus for communication, comprising:
- means for receiving a plurality of pilots comprising a plurality of physical layer identifiers from a first access point at a second access point;
- means for selectively switching between processing each of the plurality of received pilots independently and processing the plurality of received pilots to obtain information indicated by at least one time offset between the plurality of physical layer identifiers;
- means for identifying the at least one time offset between the plurality of physical layer identifiers;
- means for identifying a type of information communicated by the first access point, wherein the identification of the type of information is based on the identified at least one time offset; and
- means for invoking at least one operation of the second access point based on the identified type of information.

45. The apparatus of claim 44, further comprising means for, for each of the plurality of received pilots, decoding the pilot using a corresponding one of the physical layer identifiers.

46. The apparatus of claim 44, wherein the identification of the type of information communicated by the first access point is further based on the plurality of physical layer identifiers.

47. A non-transitory computer-readable medium comprising code for causing a computer to:
- receive a plurality of pilots comprising a plurality of physical layer identifiers from a first access point at a second access point;
- selectively switch between processing each of the plurality of received pilots independently and processing the plurality of received pilots to obtain information indicated by at least one time offset between the plurality of physical layer identifiers;
- identify the at least one time offset between the plurality of physical layer identifiers;
- identify a type of information communicated by the first access point, wherein the identification of the type of information is based on the identified at least one time offset; and
- invoke at least one operation of the second access point based on the identified type of information.

48. The apparatus of claim 1, wherein the selection is further based on a mapping of different types of information to different time offsets between physical layer identifiers.

49. The apparatus of claim 25, wherein the identification of the type of information communicated by the first access point is further based on a mapping of different types of information to different time offsets between physical layer identifiers.

* * * * *